(12) United States Patent
Curt et al.

(10) Patent No.: US 8,544,158 B2
(45) Date of Patent: *Oct. 1, 2013

(54) FLUID FILTER WITH AN ATTACHMENT STRUCTURE ON AN ENDPLATE OF THE FILTERING ELEMENT

(75) Inventors: Carey A. Curt, Cookeville, TN (US); Ismail C. Bagci, Cookeville, TN (US); Gregory D. Shope, Cookeville, TN (US); Terry W. Shults, Cookeville, TN (US); Pierrick Bonzi, Tregunc (FR)

(73) Assignee: Cummins Filtration IP, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/126,263

(22) PCT Filed: Nov. 4, 2009

(86) PCT No.: PCT/US2009/063224
§ 371 (c)(1),
(2), (4) Date: Apr. 27, 2011

(87) PCT Pub. No.: WO2010/053954
PCT Pub. Date: May 14, 2010

(65) Prior Publication Data
US 2011/0203099 A1 Aug. 25, 2011

Related U.S. Application Data

(63) Continuation-in-part of application No. 12/265,370, filed on Nov. 5, 2008.

(51) Int. Cl.
*B01D 27/00* (2006.01)
*B01D 33/27* (2006.01)

(52) U.S. Cl.
USPC .......... 29/428; 210/805; 210/136; 210/167.3; 210/194; 210/321.72; 210/416.1; 210/457; 210/497.01

(58) Field of Classification Search
None
See application file for complete search history.

(56) References Cited

U.S. PATENT DOCUMENTS 4,349,434 A * 9/1982 Jaworski .................... 210/94
RE35,900 E 9/1998 Meissner
(Continued)

FOREIGN PATENT DOCUMENTS

DE 102005040417 3/2007
EP 0718021 6/1996
(Continued)

OTHER PUBLICATIONS

International Search Report for international application No. PCT/US2009/063224, dated May 25, 2010 (3 pages).

(Continued)

*Primary Examiner* — Krishnan S Menon
*Assistant Examiner* — Allison M Gionta
(74) *Attorney, Agent, or Firm* — Hamre, Schumann, Mueller & Larson, P.C.

(57) ABSTRACT

A fluid filter includes a filter element having a filtering media disposed between two endplates. One endplate includes an open flow passage that allows a working fluid to flow into or out of the media during operation. The other endplate includes a connection structure. A cover houses the filter element, and has an opening that is an inlet or outlet in fluid communication with the opening of the one endplate. The cover includes another fill opening proximate the other endplate. A cap is connected to the connection structure of the other endplate to close the opening of the cover. The cover is retained between the cap and other endplate. Generally, the attachment configuration between the cap and the other endplate of the filter element helps ensure that the filter element with the correct micron rating is installed in a filtration system.

20 Claims, 16 Drawing Sheets

(56) References Cited

U.S. PATENT DOCUMENTS

| | | |
|---|---|---|
| 6,344,146 B1 | 2/2002 | Moorehead et al. |
| 6,607,665 B2 | 8/2003 | Fick et al. |
| 6,733,669 B1 | 5/2004 | Crick |
| 6,814,243 B2 | 11/2004 | Amstutz et al. |
| 7,393,455 B1 | 7/2008 | Tondreau et al. |
| 7,585,409 B2 | 9/2009 | Bommi et al. |
| 2003/0222010 A1 | 12/2003 | Bassett et al. |
| 2004/0031745 A1* | 2/2004 | Moessinger et al. ....... 210/323.2 |
| 2005/0000886 A1 | 1/2005 | Reynolds et al. |
| 2006/0096934 A1 | 5/2006 | Weinberger et al. |
| 2006/0231479 A1 | 10/2006 | Clausen et al. |
| 2008/0296809 A1 | 12/2008 | Kreiner |
| 2008/0308481 A1 | 12/2008 | Wieczorek et al. |

FOREIGN PATENT DOCUMENTS

| | | |
|---|---|---|
| EP | 1285683 | 2/2003 |
| KR | 10-0296232 | 5/2001 |
| WO | 96/02311 | 2/1996 |
| WO | 2004/091750 | 10/2004 |
| WO | 2007/023174 | 3/2007 |

OTHER PUBLICATIONS

Written Opinion of the International Searching Authority for international application No. PCT/US2009/063224, dated May 25, 2010 (4 pages).

Extended European Search Report for European patent application No. 09825331.3, dated Mar. 20, 2012 (5 pages).

* cited by examiner

FLUID FILTER WITH AN ATTACHMENT STRUCTURE ON AN ENDPLATE OF THE FILTERING ELEMENT

This application is being filed as a PCT International Phase Application in the name of CUMMINS FILTRATION IP INC, and claims the benefit of U.S. application Ser. No. 12/265,370 filed Nov. 5, 2008 and entitled "FLUID FILTER WITH AN ATTACHMENT STRUCTURE ON AN ENDPLATE OF THE FILTERING ELEMENT," which is hereby incorporated by reference in its entirety.

FIELD

The present disclosure relates generally to fluid filters and their assemblies. More particularly, the present disclosure relates to an improved attachment interface of a filter where its filter element is directly connected to a cap, and retains the fluid filter shell. Such a design can help ensure use of a filter element with the proper micron rating.

BACKGROUND

Fluid filters are widely known and used in various systems and applications, for example such systems that require particle and/or fluid separation from a working fluid. As one example, fuel filtration systems for engines are well known and employ fluid filters that oftentimes have fuel filtration capabilities based on different micron ratings. Generally, a micron rating for a fluid filter is one way of indicating the ability of the filter's media to remove contaminants by the size of particles it is exposed to. As some examples, fluid filters can have micron rated filter elements ranging from 3 to 50 micron.

Installing the proper micron rated filter element into a fluid filter is important for maintaining efficient filtration in a given filtration system and for protecting equipment, such as an engine. With fuel filters, for example, their filter elements often look similar and inadvertent installation of the wrong micron rated filter element can occur. For example, such an accident can easily occur during servicing and maintenance in the aftermarket. It is desired that such accidents be prevented or at least minimized.

Improvements can be made upon existing fluid filter designs. Particularly, structural improvements can be made as to how a fluid filter is assembled and to help control that the correct micron rated filter element is installed.

SUMMARY

The present disclosure generally relates to a fluid filter that includes a unique attachment interface for its assembly. Generally, the unique attachment interface includes a filter element with an endplate that is directly connected to a cap that can be opened and closed for filling. The endplate structure described herein can also provide a control feature helpful to insure that the correct filter element is being assembled into the fluid filter and can help make installation easier.

In one embodiment, a fluid filter includes a filter element having a media disposed between two endplates. The media allows a working fluid to be filtered through the media. One of the two endplates includes an open flow passage that allows the working fluid to flow into or out of the filter media during operation. The other of the two endplates includes a connection structure. A cover houses the filter element. The cover has an opening in fluid communication with the flow passage of the one endplate and has a fill opening proximate the other of the two endplates. A cap closes the cover at the opening proximate the other of the two endplates. The cap is connected to the connection structure of the other of the two endplates, such that the cover is retained thereby.

The endplate can be configured and arranged to control which filter element can be used in the fluid filter assembly. In some embodiments, the connection structure of the other of the two endplates corresponds to a micron rating of the media of the filter element, and controls which filter element can be used in the fluid filter assembly. As one example, the connection structure is a threaded arrangement.

In other embodiments, the other of the two endplates includes at least one slot on an outer surface thereof. In some examples, the at least one slot is configured to correspond to a micron rating of the media of the filter element.

In yet another embodiment, the other of the two endplates includes a plurality of tabs disposed about a perimeter thereof. The tabs extend outward from the perimeter. In some examples, the tabs are configured to correspond to a micron rating of the media.

In another embodiment, a method for assembling a fluid filter assembly includes placing a filter element within a cover that generally houses the filter element. A cap is inserted through an opening of the cover. The cap is directly connected to an endplate of the filter element. Through the direct connection of the cap and endplate, the cover is retained by the cap and filter element.

DETAILED DESCRIPTION

Figure 1:
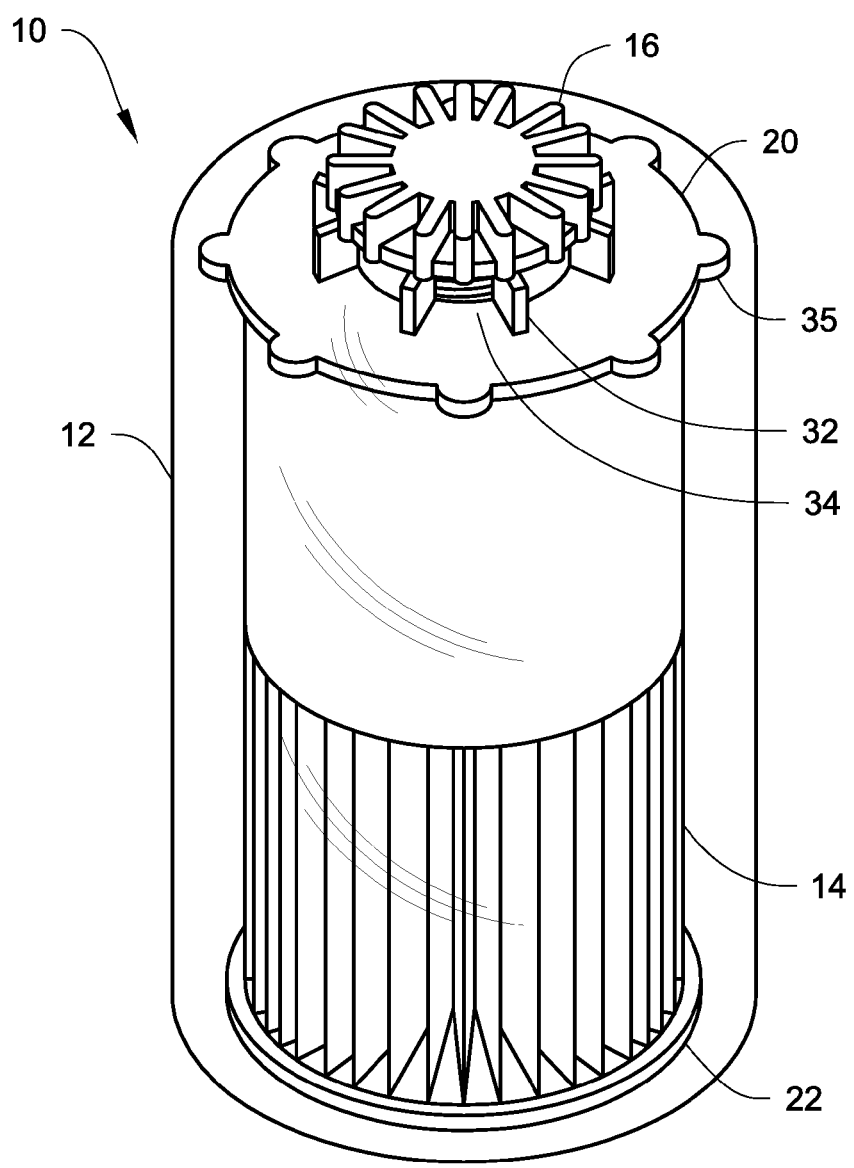
FIG. 1 is a perspective view of one embodiment of a fluid filter.

FIGS. 1-11 of the present disclosure generally relate to a fluid filter that includes a unique attachment interface for its assembly, where a filter element is directly connected to a cap that can be opened and closed for filling. The endplate structure described herein can provide a control feature helpful to insure that the correct filter element is being assembled into the fluid filter and can help make installation easier. The descriptions herein can also provide a filter element that protects aftermarket considerations, as the correct filter element is needed for installation/servicing.

FIGS. 1-8 show one example of a fluid filter 10. In one embodiment, the fluid filter 10 is employed as a fuel filter. Fuel filters and their uses are well known. For illustration purposes only, the inventive concepts for a filter design are described with respect to a fuel filter. It will be appreciated, however, that the disclosure is not meant to be limiting to fuel filters, and that the inventive concepts described herein can be used in and suitably adapted for other fluid filter assemblies, such as by-pass and lube filtration technologies. It will be further appreciated that various working fluids in need of filtration, including but not limited to fuel, can benefit from the inventive concepts disclosed herein.

FIGS. 1-8 show an improved attachment interface or configuration that can be used in such fuel filtration systems. The fluid filter 10 is an assembly generally including a cover 12, a filter element 11, and a cap 16.

The filter element 11 resembles a cartridge-like structure having a filtering media 14 disposed between two endplates 20, 22. Generally, the media 14 allows a working fluid to be filtered therethrough. It will be appreciated that material for filtration media and their constructions are well known. It further will be appreciated that the filtering media 14 can have various micron ratings to achieve a desired filtration capability for removing undesired contaminants of various sizes from the working fluid. As some examples only, the filtering media 14 can be constructed of material so as to give the filtering media a micron rating in the range of 3 to 50 microns. Installing the proper micron rated filter element into a fluid filter is important for maintaining efficient filtration in a given filtration system and for protecting operating equipment, such as an engine. As one example shown in FIG. 1, the media 14 is a pleated material that can have a wrap 14a. It will be appreciated that the pleated construction and the wrap are just one example of a construction for the media 14 and are not meant to be limiting.

In one embodiment, endplate 22 is a bottom endplate and includes an open flow passage 52 (best shown in FIG. 5) that allows a working fluid to flow into or out of the filtering media 14 during operation. The flow passage 52 is for connecting the fluid filter 10 to other equipment of a filtration system. In one embodiment, endplate 20 is a top endplate. It will be appreciated that either endplate 20, 22 may be configured to have the flow passage 52, and that the reference to top and bottom is for illustration purposes. The orientation of the filter element 11 with respect to its positioning in the cover 12 is dependent upon which of the endplates 20, 22 has the flow passage 52.

Figure 2:
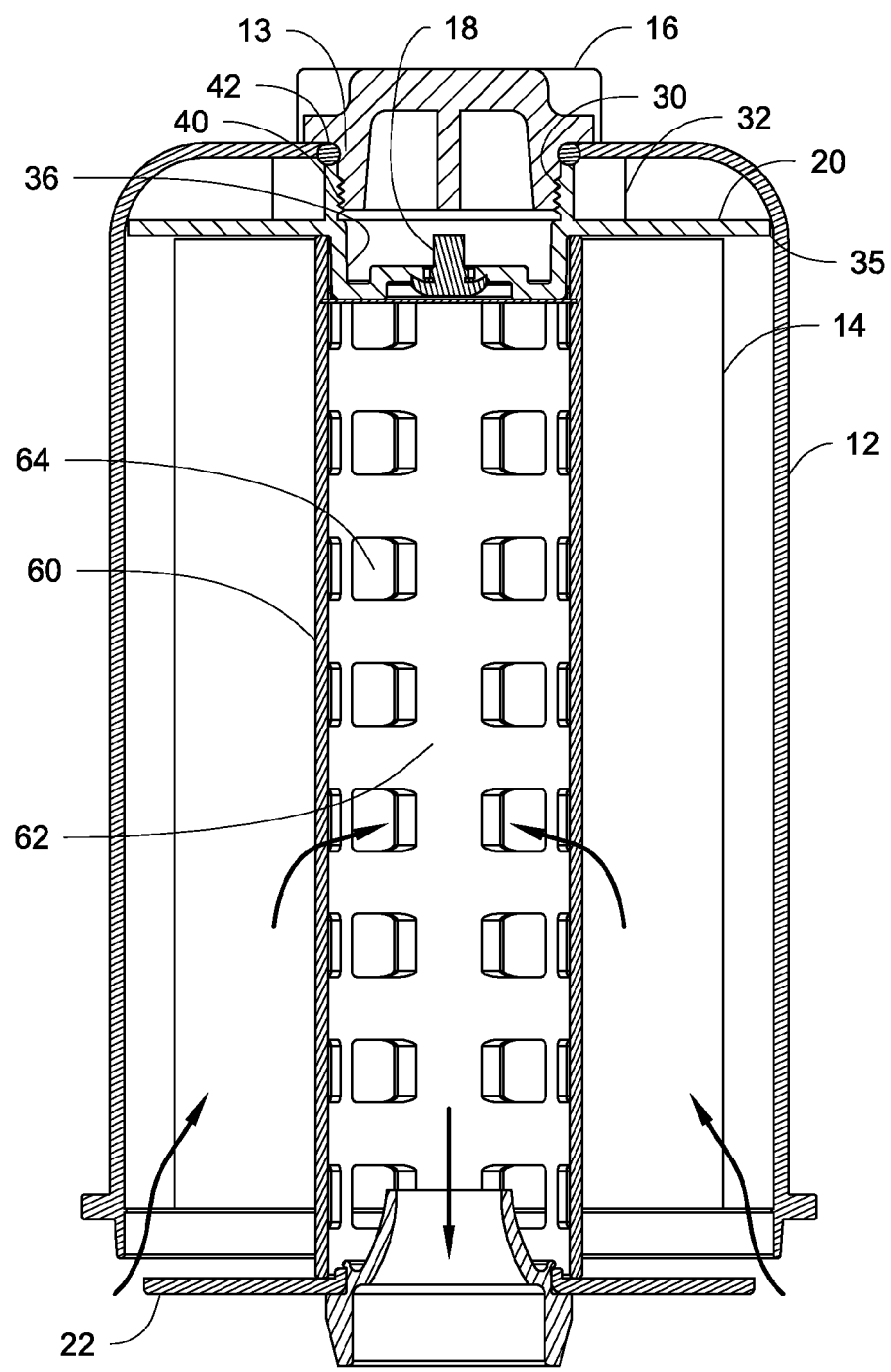
FIG. 2 is a sectional view of the fluid filter of FIG. 1 and showing one embodiment of a filter element having its endplate directly connected to a cap.
Figure 3:
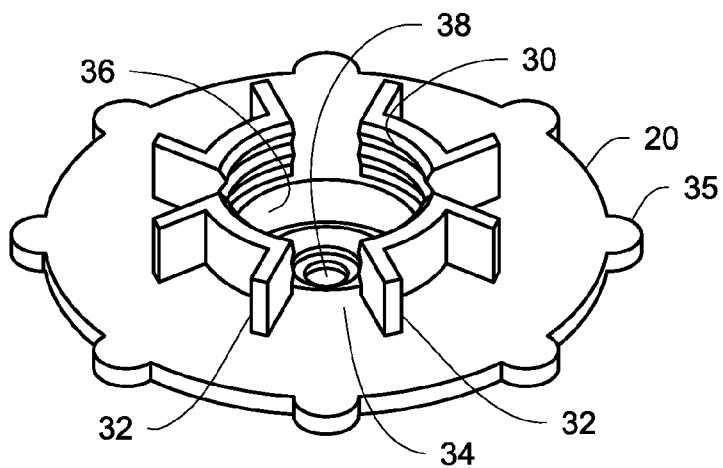
FIG. 3 is a perspective view of the endplate shown alone.
Figure 4:
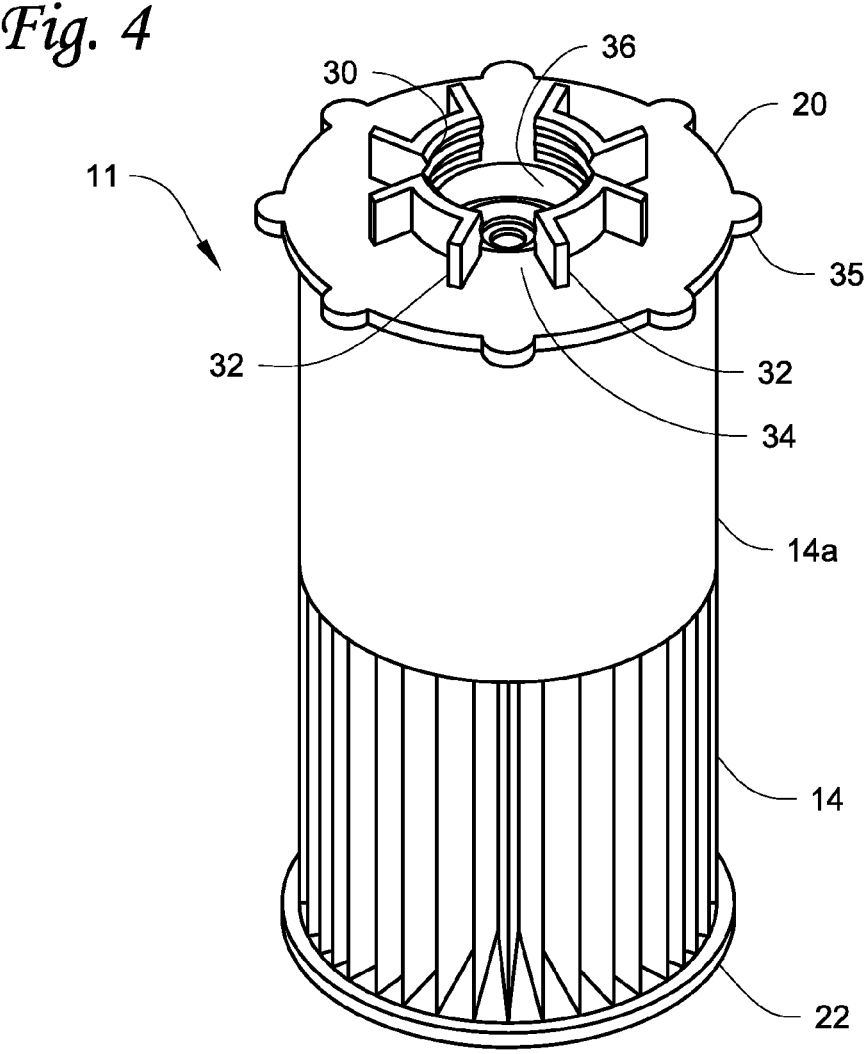
FIG. 4 is a top perspective view of the filter element of FIG. 1 alone.
Figure 5:
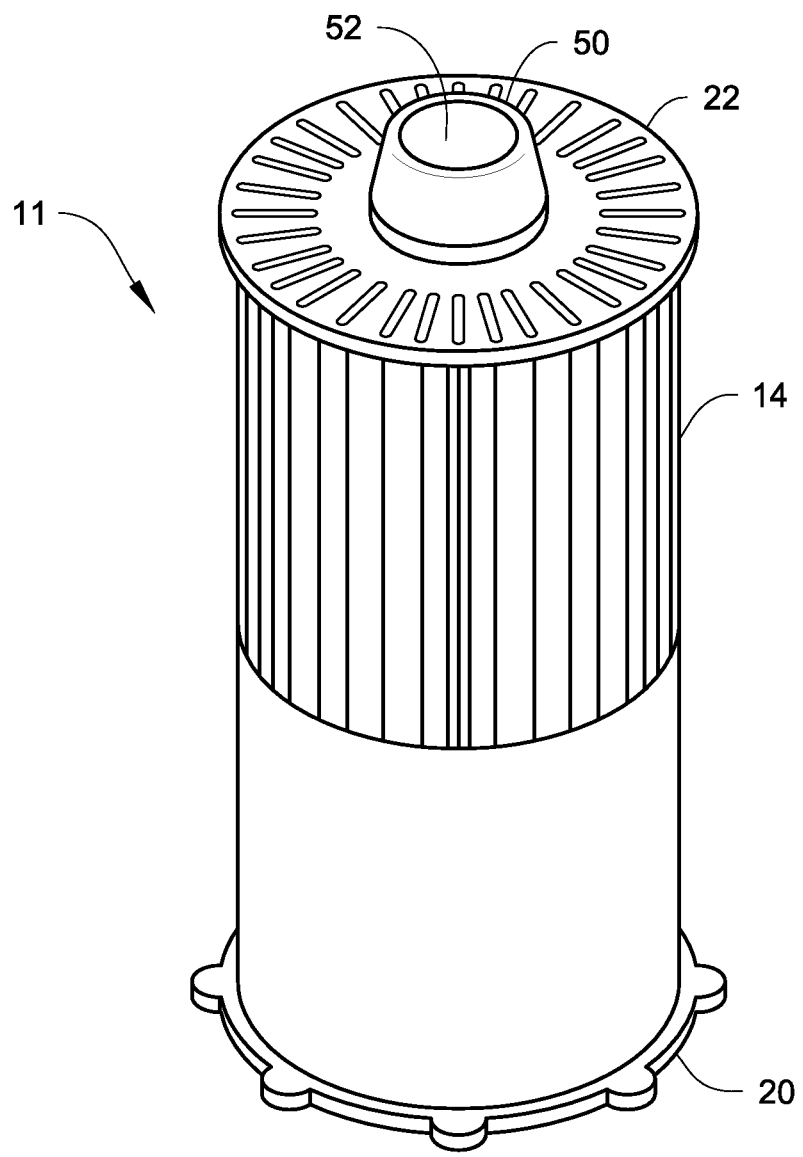
FIG. 5 is a bottom perspective view of the filter element of FIG. 1 alone.
Figure 6:
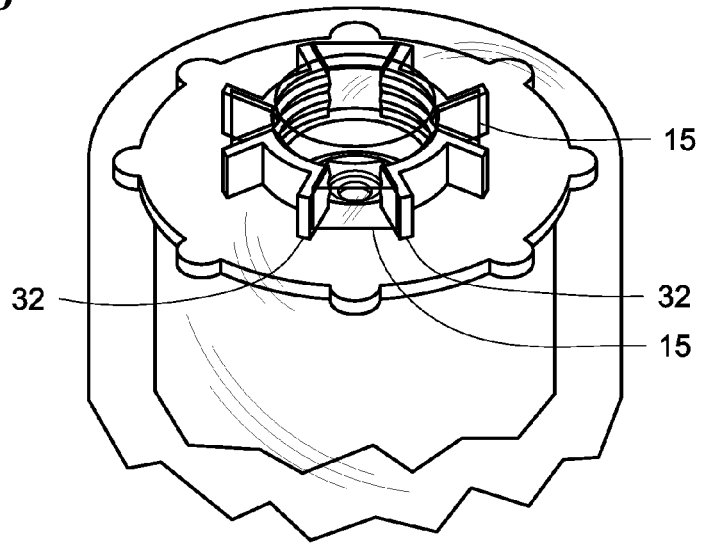
FIG. 6 is a top view of the fluid filter of FIG. 1.
Figure 7:
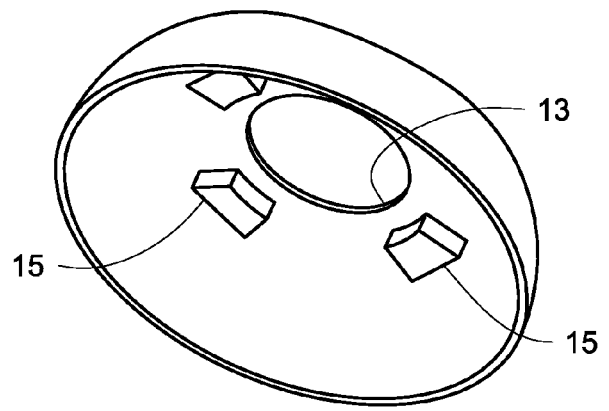
FIG. 7 is a partially exploded view of the fluid filter of FIG. 1.
Figure 7:
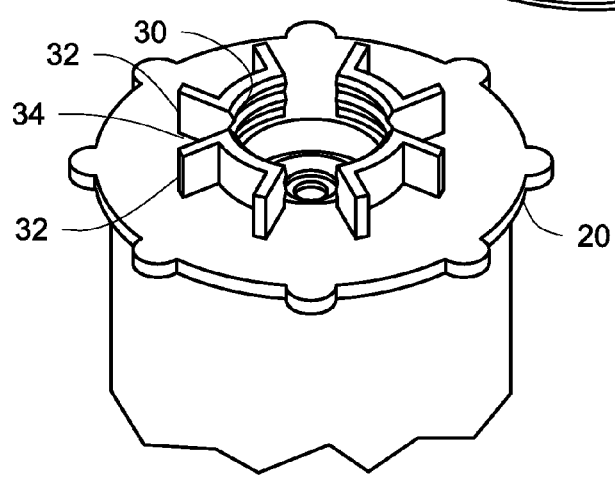
Figure 8:
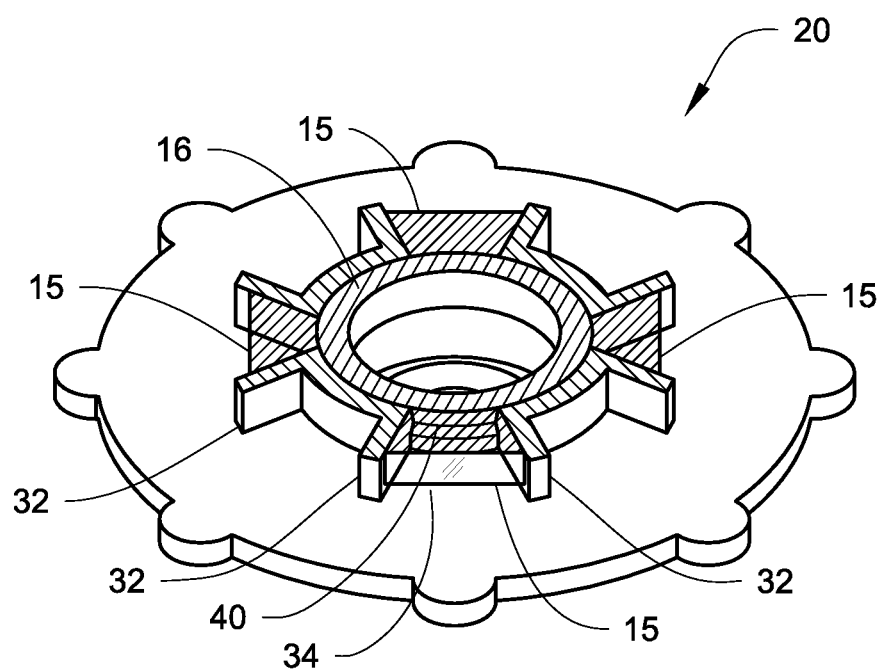
FIG. 8 is a top sectional view of the fluid filter of FIG. 1.

In some examples, the endplate that does not have the flow passage (e.g. endplate 20) is a closed structure. That is, the endplate 20 does not have any openings and closes off one end of the filter media. In other examples, the endplate 20 can have a valve 18 disposed at an opening 38 thereof. When such a valve 18 is employed, it can close over time during operation, for example when the filter element 11 needs to be replaced, such as when the fluid filter 10 is filled with 'dirty' fluid during its particular filtration application (e.g. fuel filtration). As one example, the valve 18 is a check valve or cracking pressure valve as generally known by one of skill in the art. In FIG. 2, the valve 18 is a one-way seated member or plunger-like structure that can close the opening in the endplate 20.

The cover 12 generally houses the filter element 11. The cover 12 has an opening that is in fluid communication with the flow passage 52 of the endplate 22. As shown in FIG. 1, the cover 12 may be a clear or generally transparent cover that one can see through. The cover 12 is generally open on a side or end that is in fluid communication with the flow passage 52 (see bottom of fluid filter 10). The cover 12 also includes an opening 13 proximate the endplate 20. As shown, the cover 12 has wall surfaces that surround the opening 13. These wall surfaces are retained between the connection of the cap 16 to the endplate 20 when the fluid filter 10 is assembled (further described below).

The cap 16 closes the opening 13 of the cover 12. A seal 42 can be disposed about the opening 13 or on the cap 16. In one embodiment, the seal 42 is an o-ring. In the closed position, the cap 16 is directly connected to the endplate 20.

The endplate 20 includes a connection structure 30. The cap 16 is connected to the connection structure 30 of the endplate 20, such that the cover 12 is retained between the cap 16 and the endplate 20 (see e.g. FIG. 2).

In one embodiment, the connection structure 30 of the endplate includes a threaded arrangement. As shown, the connection structure 30 is a threaded portion that can be threadedly engaged with a threaded portion 40 on the cap 16. As one example, the connection structure 30 is constructed as a raised boss structure extending from a main surface of the endplate 20 and having a female threaded portion, and the cap 16 is constructed as a male threaded portion.

It will be appreciated that other threaded arrangements may be employed, for example, the endplate 20 may have the male thread and the cap may have the female thread. It further will be appreciated that the connection structure 30 of the endplate 20 is not meant to be limiting to a threaded arrangement. Other examples that can be used include but are not limited to a snap fit, an interference fit, or a quarter turn lock, or other connection structures as known in the art. Generally, a direct connection is desired between the cap 16 and the endplate 20, so that the cover 12 is retained by such connection, but where the specific nature of the connection is not meant to be limiting.

With the direct connection between the cap 16 and the endplate 20, the cover 12 can be easier and more cost effective to produce. In previous fuel filters, the cap was connected directly to the shell or cover (e.g. by threaded engagement) and typically employed a coil spring to help maintain the filter element (e.g. cartridge) in position. The fluid filters described herein, however, eliminate the thread on the cover or housing and can eliminate the need for a spring. Such a spring-less configuration can provide for a more generically produced cover with added freedom as to the materials that may be employed to produce it. As the spring can be eliminated, problems associated with spring failure or spring pressure overcoming the assembly connection can also be avoided. Other benefits can include an overall height reduction of the fluid filter, since a spring is no longer needed which previously increased filter height. Further, as the direct connection of the endplate with the cap retains the cover, easier servicing can be achieved because the cap, filter element, and cover can be removed together without first removing the cover from the filter element.

It will be appreciated, however, that the fluid filter designs described herein (including fluid filter 10) can be used in retrofit applications of existing fluid filters. As one example of a retrofit application, the endplate and cap design described herein can be used with other fuel filters such as those produced by DAVCO Technology, LLC. For example, the threaded portion of the endplate 20 can be constructed to mate with threaded configurations of existing caps. Additionally, the endplate 20 can have its connection structure 30 be constructed so that the raised boss structure has a recessed surface 36 that can act as a spring pocket when a spring is used. The raised boss of the connection structure 30 and the recessed surface 36 can allow for a spring to be disposed between the cap 16 and the endplate 20, while having enough clearance so that the spring does not interfere with the attachment of the cap 16 and the endplate 20. For example, the diameter considerations of the recessed surface 36 and boss structure can be modified accordingly so as to provide retrofit capability.

As described above, the endplate 20 in some embodiments is configured and arranged to control which filter element can be used in the fluid filter assembly. In one example, the connection structure 30 is configured to indicate a micron rating of the filter element. When a threaded engagement is employed, for example, the threaded portion on the endplate 20 can have a certain thread configuration that corresponds to a certain micron rating. For instance, more or less threads and the spacing of the threads can be modified to correspond to various micron ratings (e.g. ranging from 3 to 50 microns). That is, the micron rating of the media of the filter element can be dependant upon and correspond to the thread structure used for the endplate. For example, low micron rated filter elements may have less threads and higher micron rated elements can have more threads. In such a configuration, the connection structure 30 (e.g. threaded portion) can help ensure that the filter element 11 with the correct micron rating is installed. That is, if the correct micron rated filter element is not selected, then it will not mate to the cap 16.

The endplate 20 can include other structures, such as the slots and tabs described below, which can help with indicating the micron rating of the filter element 11, and also help with alignment and maintaining the position of the filter element 11. While FIGS. 1-8 show these features together in the filter element 11, they are not necessarily required in combination as the filter element 11 can include any one of these structures alone or in combination with the threaded engagement feature described above.

As further shown in FIGS. 1-8, the endplate 20 in some embodiments can include at least one slot 34 on its outer surface. In one example, an outer side wall of the connection structure 30 (e.g. raised boss) can form part of the slot 34. Additional sidewalls 32 form the remaining space of the slot 34, where the sidewalls 32 extend outward from the outer surface of the connection structure 30 and along the main surface of the endplate 20. The slot 34 is receivable of a protrusion 15 that extends from an inner surface of the cover 12 (best shown in FIGS. 6-8). The protrusion 15 can resemble a wedge-like structure that plugs or can otherwise be inserted into the space created by the slot 34.

With further reference to the sidewalls 32, the sidewalls also extend generally upward from the main surface of the endplate 20. As shown, the sidewalls 32 are generally perpendicular to the main surface of the endplate 20. It will be appreciated, however, that the sidewalls 32 can extend from the main surface of the endplate 20 at different angles. As one example, the sidewalls 32 can provide a self-ramping feature such that they are come closer together or taper toward each other at the main surface of the endplate. Likewise, the protrusion 15 can taper so as to match the same shape taken by the slot 34. Such a configuration can allow for easier locating and installment of the cover 12 over the filter element 11.

As shown, a plurality of slots 34 and protrusions 15 may be used. It will be appreciated that the number of slots 34 and protrusions 15 is not meant to be limiting as more or less slots 34 and protrusions 15 may be employed than what is shown in the Figs.

When the slot 34 and protrusion 15 are engaged, their relationship can be configured such that the filter element 11 and the cover 12 are retained to each other. As some non-limiting examples, the slot 34 and protrusion 15 can have an interference fit or a snap fit configuration when they are engaged. It will be appreciated that the protrusion 15 can be released from engagement with the slot 34, such as when a sufficient amount of force is used to remove the cover 12 from the endplate 20 if such disassembly is desired.

In some embodiments, the slot(s) 34 are configured and arranged to control which filter element can be used in the fluid filter assembly. In one example, the slot(s) 34 can correspond to a micron rating of the filter element 11. By way of example, the endplate 20 can have slots 34 of a certain size and/or shape, and/or a certain number of slots 34 and spacing, which can be used to show correspondence to a certain micron rating. That is, the micron rating of the media 14 of the filter element 11 is dependant upon and corresponds to the slot 34 structure. For example, low micron rated filter elements may have less or smaller slots and higher micron rated elements can have more or larger slots. In such a configuration, the slots 34 can help ensure that the filter element 11 with the correct micron rating is installed. That is, if the correct micron rated filter element is not selected, then it will not engage with the cover 12.

In another embodiment, a plurality of tabs 35 can be disposed about a perimeter of the endplate 20. As shown, the tabs 35 extend outward from the perimeter of the endplate 20. The tabs 35 can resemble bump-like structures protruding from the endplate 20. As shown in FIG. 2, for example, the tabs 35 can contact the inner sidewall of the cover 12. The arrangement of the tabs 35 can help align the filter element 11 within the cover 12. In some embodiments, the tabs 35 can engage the inner sidewall of the cover 12 in an interference fit, but also be releasable if enough force is applied to remove the contact. Other configurations can include, but are not limited to the cover 12 having grooves (not shown) along the inner sidewall, such that the tabs 35 slide within the grooves when the filter element 11 is placed inside the cover 12. If grooves are employed, the tabs 35 can be releasably engaged with the grooves to remove the filter element 11 from the cover 12 if such disassembly is desired. It will be appreciated that such grooves easily can be formed or machined into the inner sidewall of the cover 12 as channels that are slightly larger than the dimension of the tabs 35, such that the tabs 35 can slide along when the filter element 11 is inserted into the cover 12. Some examples of the engagement structure between the tab 35 and grooves may be, but is not limited to, a relatively loose engagement or an interference fit.

In some embodiments, the tabs 35 are configured and arranged to control which filter element can be used in the fluid filter assembly. In one example, the tabs 35 can correspond to a micron rating of the filter element 11. By way of example, the endplate 20 can have tabs 35 of a certain size and/or shape, and/or a certain number of tabs 35 and spacing, which can be used to show correspondence to a certain micron rating. That is, the micron rating of the media 14 is dependent upon and corresponds to the tab 35 structure. For example, low micron rated filter elements may have less or smaller tabs and higher micron rated elements can have more or larger tabs. In such a configuration, the tabs 35 can help ensure that the filter element 11 with the correct micron rating is installed. That is, if the correct micron rated filter element is not selected, then it cannot be used with the cover 12.

With reference to endplate 22, the endplate 22 includes the flow passage 52. The endplate 22 can be connected to a filtration system (e.g. fuel filtration). The flow passage 52 allows for exit of 'clean' filtered fluid from the fluid filter 10 or allows for entry of fluid to be filtered depending on the direction of fluid flow. The filter element 11 is disposed within the cover 12, such that that endplate 22 is proximate the generally open side or end of the cover. Such a configuration is sometimes desired since this area of the cover is the inlet/outlet side where filtered fluid and fluid to be filtered respectively exit and enter the fluid filter 10. In some embodiments, a gasket seal 50 is disposed within the flow passage 52. The gasket seal 50 can resemble a grommet-like structure that plugs into the flow passage 52. The gasket seal 50 helps to seal the fluid filter 10 when it is connected to remaining equipment of a filtration system and helps separate filtered fluid from fluid to be filtered.

As further shown in FIG. 2, for example, the filter element 11 can include a center tube 60 having a flow passage 62 therethrough in fluid communication with the open flow passage 52 (see e.g. FIG. 10) of endplate 22. As shown, the center tube 60 is connected to both endplates 20, 22, where the media 14 is disposed around the center tube 60 in a cylindrical arrangement, and where the center tube 62 includes apertures 64 that allow the working fluid to flow into and out of the flow passage 62 of the center tube 60. Center tubes in such fluid filters are well-known and need not be further described. It also will be appreciated that a center tube may not be employed at all and the center area inside the filter element 11 can be the flow passage in fluid communication with flow passage 52.

As above, the inventive concepts for an improved filter design are described with respect to a fuel filter for illustration purposes only. It will be appreciated, however, that the disclosure is not meant to be limiting to fuel filters, and that the inventive concepts described herein can be used in and suitably adapted for other fluid filter assemblies, such as by-pass and lube filtration technologies. It will be further appreciated that various working fluids in need of filtration, including but not limited to fuel, can benefit from the inventive concepts disclosed herein.

Figure 9:
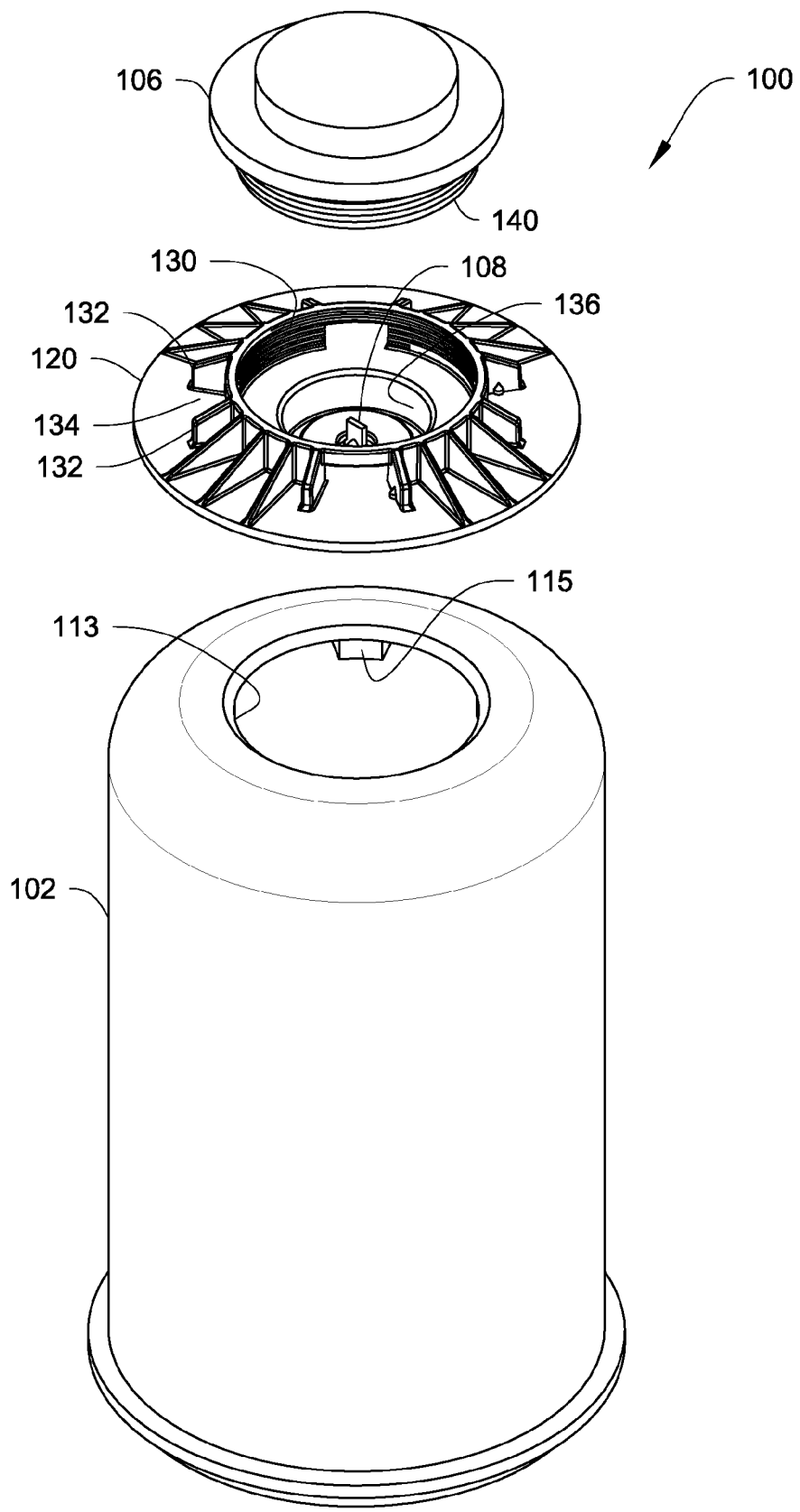
FIG. 9 is an exploded view of another embodiment of a fluid filter.
Figure 10:
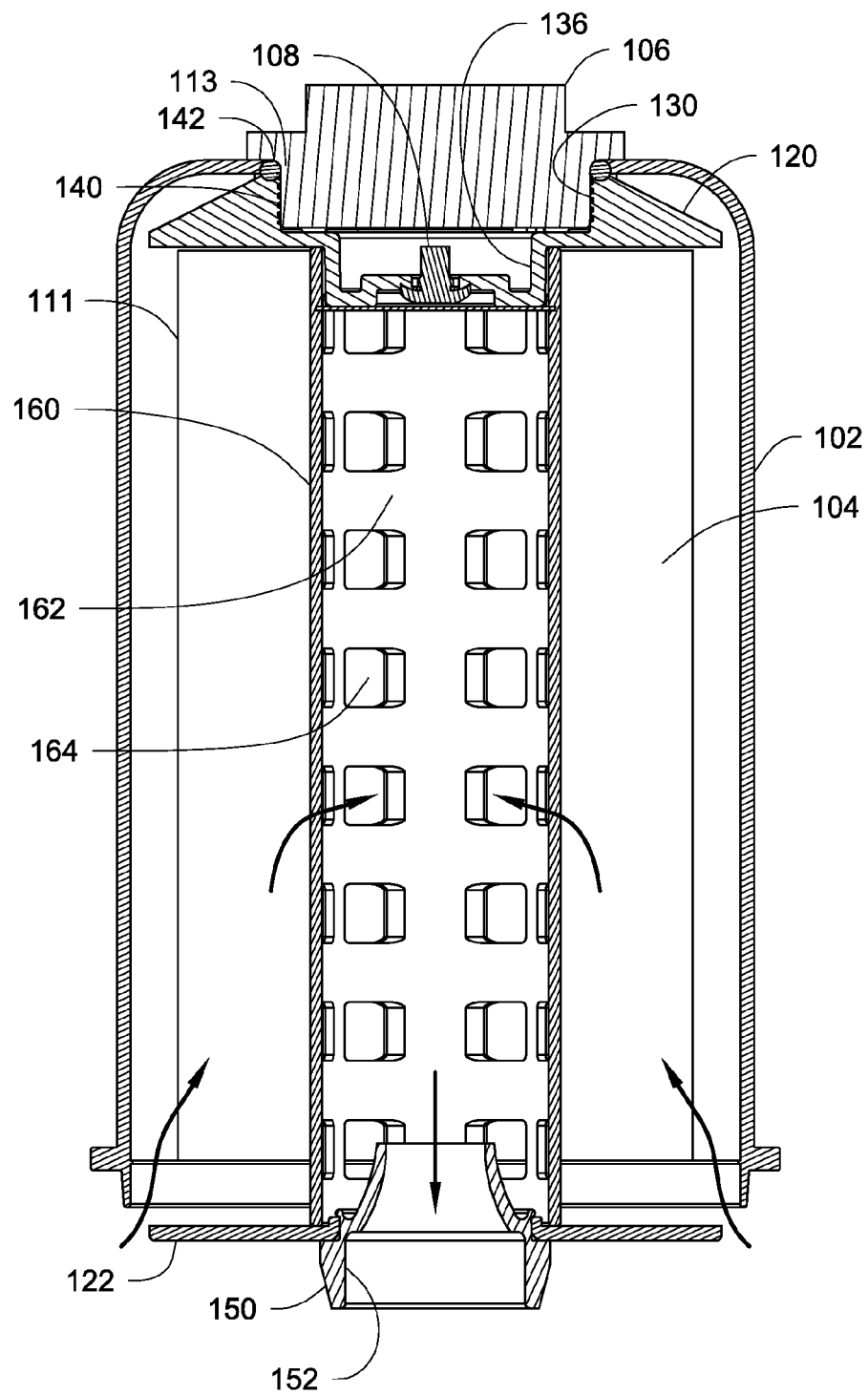
FIG. 10 is sectional view of the fluid filter of FIG. 9.
Figure 11:
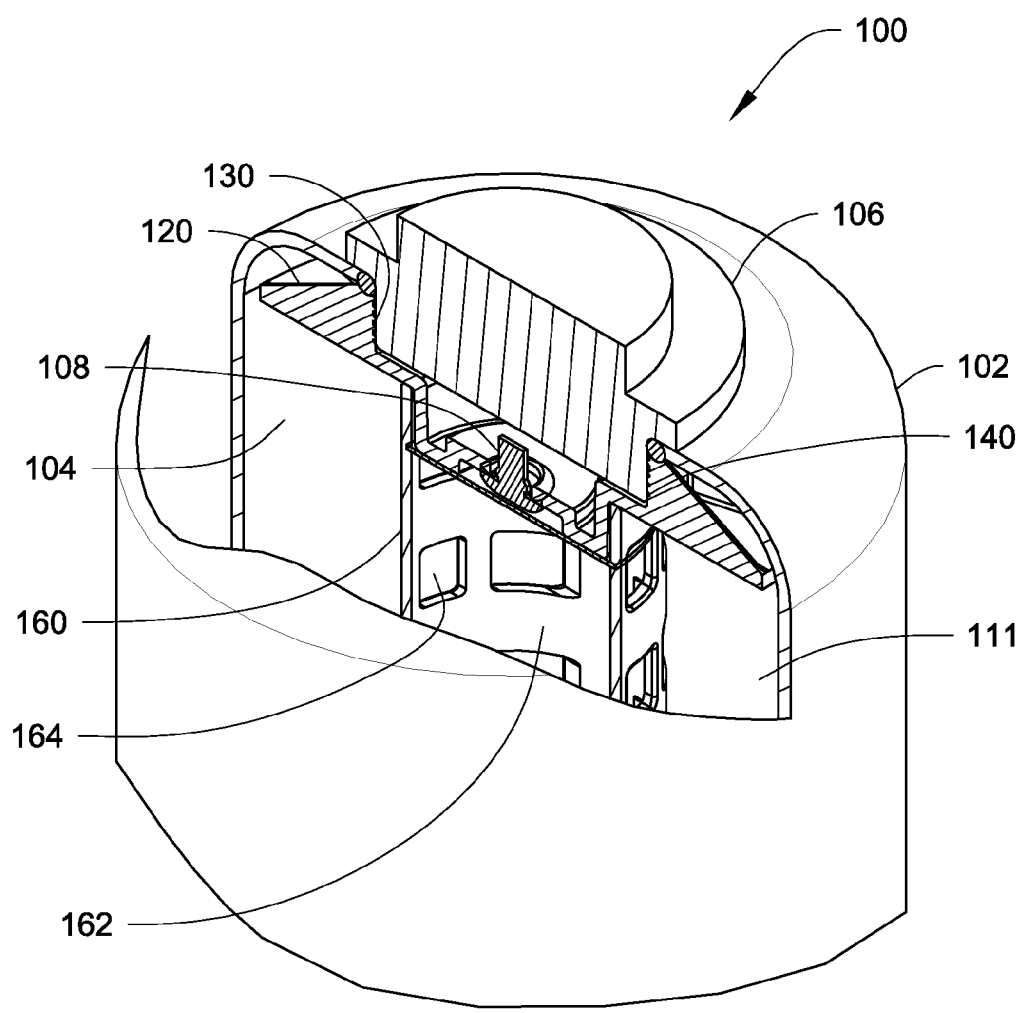
FIG. 11 is a partial sectional view of the fluid filter of FIG. 9 taken from the top.

FIGS. 9-11 show another example of a fluid filter 100 with an improved attachment interface. As with fluid filter 10, the fluid filter 100 is an assembly including a cover 102, a filter element 111 (best shown in FIG. 10), and a cap 106. A difference between fluid filter 10 and fluid filter 100 is that fluid filter 100 does not show outer tabs on the endplate (e.g. tabs 35 in FIGS. 1-8).

As with filter element 11, the filter element 111 resembles a cartridge-like structure having a filtering media 104 disposed between two endplates 120, 122. Generally, the media 104 allows a working fluid to be filtered therethrough. It will be appreciated that material for filtration media and their constructions are well known. It further will be appreciated that the filtering media 104 can have various micron ratings to achieve a desired filtration capability for removing undesired contaminants of various sizes from the working fluid. As some examples only, the filtering media 104 can be constructed of material so as to give the filtering media a micron rating in the range of 3 to 50 microns. Installing the proper micron rated filter element into a fluid filter is important for maintaining efficient filtration in a given filtration system and for protecting operating equipment, such as an engine.

In one embodiment, endplate 122 is a bottom endplate and includes an open flow passage 152 (best shown in FIG. 10) that allows a working fluid to flow into or out of the filtering media 104 during operation. The flow passage 152 is for connecting the fluid filter 100 to other equipment of a filtration system. In one embodiment, endplate 120 is a top endplate. It will be appreciated that either endplate 120, 122 may be configured to have the flow passage 152, and that the reference to top and bottom is for illustration purposes. The orientation of the filter element 111 with respect to its positioning in the cover 102 is dependent upon which of the endplates 120, 122 has the flow passage 152.

In some examples, the endplate that does not have the flow passage (e.g. endplate 120) is a closed structure. That is, the endplate 120 does not have any openings and closes off one end of the filter media 104. In other examples, the endplate 120 can have a valve 108 disposed at an opening thereof. When such a valve 108 is employed, it can close over time during operation, for example when the filter element 111 needs to be replaced, such as when the fluid filter 100 is filled with 'dirty' fluid during its particular filtration application (e.g. fuel filtration). As one example, the valve 108 is a check valve or cracking pressure valve as generally known by one of skill in the art. In FIG. 2, the valve 108 is a one-way seated member or plunger-like structure that can close the opening in the endplate 120.

The cover 102 generally houses the filter element 111. The cover 102 has an opening that is in fluid communication with the flow passage 152 of the endplate 122. As shown in FIG. 1, the cover 102 also may be a clear or generally transparent cover that one can see through. The cover 102 is generally open on a side or end that is in fluid communication with the flow passage 152 (see bottom of fluid filter 100). The cover 102 also includes an opening 113 proximate the endplate 120. As shown, the cover 102 has wall surfaces that surround the opening 113. These wall surfaces are retained between the connection of the cap 106 to the endplate 120 when the fluid filter 100 is assembled (further described below).

The cap 106 closes the opening 113 of the cover 102. A seal 142 can be disposed about the opening 113 or on the cap 106. In one embodiment, the seal 142 is an o-ring. In the closed position, the cap 106 is directly connected to the endplate 120.

The endplate 120 includes a connection structure 130. The cap 106 is connected to the connection structure 130 of the endplate 120, such that the cover 102 is retained between the cap 106 and the endplate 120 (see e.g. FIG. 2).

In one embodiment, the connection structure 130 of the endplate includes a threaded arrangement. As shown, the connection structure 130 is a threaded portion that can be threadedly engaged with a threaded portion 140 on the cap 106. As one example, the connection structure 130 is constructed as a raised boss structure extending from a main surface of the endplate 120 and having a female threaded portion, and the cap 106 is constructed as a male threaded portion.

It will be appreciated that other threaded arrangements may be employed, for example, the endplate 120 may have the male thread and the cap may have the female thread. It further will be appreciated that the connection structure 130 of the endplate 120 is not meant to be limiting to a threaded arrangement. Other examples that can be used include but are not limited to a snap fit, an interference fit, or a quarter turn lock, or other connection structures as known in the art.

Generally, a direct connection is desired between the cap 106 and the endplate 120, so that the cover 102 is retained by such connection, but where the specific nature of the connection is not meant to be limiting.

With the direct connection between the cap 106 and the endplate 120, the cover 102 can be easier and more cost effective to produce. In previous fuel filters, the cap was connected directly to the shell or cover (e.g. by threaded engagement) and typically employed a coil spring to help maintain the filter element (e.g. cartridge) in position. The fluid filters described herein, however, eliminate the thread on the cover or housing and can eliminate the need for a spring. Such a spring-less configuration can provide for a more generically produced cover with added freedom as to the materials that may be employed to produce it. As the spring can be eliminated, problems associated with spring failure or spring pressure overcoming the assembly connection can also be avoided. Other benefits can include an overall height reduction of the fluid filter, since a spring is no longer needed which previously increased filter height. Further, as the direct connection of the endplate with the cap retains the cover, easier servicing can be achieved because the cap, filter element, and cover can be removed together without first removing the cover from the filter element.

As with fluid filter 10 above, it will be appreciated that the fluid filter 100 can be used in retrofit applications of existing fluid filters. As one example of a retrofit application, the endplate and cap design described herein can be used with other fuel filters such as those produced by DAVCO Technology, LLC. For example, the threaded portion of the endplate 120 can be constructed to mate with threaded configurations of existing caps. Additionally, the endplate 120 can have its connection structure 130 be constructed so that the raised boss structure has a recessed surface 136 that can act as a spring pocket when a spring is used. The raised boss of the connection structure 130 and the recessed surface 136 can allow for a spring to be disposed between the cap 106 and the endplate 120, while having enough clearance so that the spring does not interfere with the attachment of the cap 106 and the endplate 120. For example, the diameter considerations of the recessed surface 136 and boss structure can be modified accordingly so as to provide retrofit capability.

As described above, the endplate 120 in some embodiments is configured and arranged to control which filter element can be used in the fluid filter assembly. In one example, the connection structure 130 is configured to indicate a micron rating of the filter element. When a threaded engagement is employed, for example, the threaded portion on the endplate 120 can have a certain thread that corresponds to a certain micron rating. For instance, more or less threads and the spacing of the threads can be modified to correspond to various micron ratings (e.g. ranging from 3 to 50 microns). That is, the micron rating of the media of the filter element can be dependant upon and correspond to the thread structure used for the endplate. In such a configuration, the connection structure 130 (e.g. threaded portion) can help ensure that the filter element 111 with the correct micron rating is installed. That is, if the correct micron rated filter element is not selected, then it will not mate to the cap 106.

The endplate 120 can include other structures, such as the slots described below, which can help with indicating the micron rating of the filter element 111, and also help with alignment and maintaining the position of the endplate 120. While FIGS. 9-11 show such micron rating, alignment, and position maintenance features together in the filter element 111, they are not necessarily required in combination with the filter element 111 (or filter element 11), which can include any one of these structures alone, or in combination with the threaded engagement feature described above.

As shown in FIGS. 9-11, the endplate 120 in some embodiments can include at least one slot 134 on its outer surface. In one example, an outer side wall of the connection structure 130 (e.g. raised boss) can form part of the slot 134. Additional sidewalls 132 form the remaining space of the slot 134, where the sidewalls 132 extend outward from the outer surface of the connection structure 130 and along the main surface of the endplate 120. The slot 134 is receivable of a protrusion 115 that extends from an inner surface of the cover 102 (best shown in FIG. 9). The protrusion 115 can resemble wedge-like structure that can plug or otherwise be inserted into the space created by the slot 134.

With further reference to the sidewalls 132, the sidewalls also extend generally upward from the main surface of the endplate 120. The sidewalls 132 are generally perpendicular to the main surface of the endplate 120, and taper toward the perimeter of the endplate 120. As with the sidewalls 32 of endplate 20, sidewalls 132 can extend from the main surface of the endplate at different angles. For example, the sidewalls 132 can be ramped such that they are come closer together or taper toward each other at the main surface of the endplate. Likewise, the protrusion 115 can taper so as to match the same shape taken by the slot 134. Such a configuration can allow for easier locating and installment of the cover 102 over the filter element 111.

As with filter element 11, a plurality of slots 134 and protrusions 115 may be used (only one protrusion 115 shown for purposes of illustration). It will be appreciated that the number of slots 134 and plugs 115 is not meant to be limiting.

When the slot 134 and protrusion 115 are engaged, their relationship can be configured such that the filter element 111 and the cover 102 are retained to each other. As some non-limiting examples, the slot 134 and protrusion 115 can have an interference fit or a snap fit configuration when they are engaged. It will be appreciated that the protrusion 115 can be released from engagement with the slot 134, such as when a sufficient amount of force is used to remove the cover 102 from the endplate 120 if such disassembly is desired.

In some embodiments, the slot(s) 134 are configured and arranged to control which filter element can be used in the fluid filter assembly. In one example, the slot(s) 134 can correspond to a micron rating of the filter element 111. By way of example, the endplate 120 can have slots 134 of a certain size and/or shape, and/or a certain number of slots 134 and spacing, which can be used to show correspondence to a certain micron rating. That is, the micron rating of the media 104 of the filter element 111 is dependant upon and corresponds to the slot 134 structure (e.g. as in fluid filter 10). In such a configuration, the slots 134 can help ensure that the filter element 111 with the correct micron rating is installed. If the correct micron rated filter element is not selected, then it will not engage with the cover 102.

Differently from fluid filter 10, fluid filter 100 does not show tabs (e.g. tabs 35) at the perimeter of the endplate 120. It will be appreciated, however, that a plurality of tabs can be disposed about a perimeter of the endplate 120 as similarly described with respect to the fluid filter 10. Also, such a tab structure if employed can be configured and arranged so as to control which filter element can be used in the fluid filter assembly. That is, tabs can be employed to correspond to a micron rating of the filter element 111.

With reference to endplate 122, the endplate 122 includes the flow passage 152. The endplate 122 can be connected to a filtration system (e.g. fuel filtration). The flow passage 152 allows for exit of 'clean' filtered fluid from the fluid filter 100 or allows for entry of fluid to be filtered depending on the direction of fluid flow. The filter element 111 is disposed within the cover 102, such that that endplate 122 is proximate the generally open side or end of the cover. Such a configuration is sometimes desired since this area of the cover is the inlet/outlet side where filtered fluid and fluid to be filtered respectively exit and enter the fluid filter 100. In some embodiments, a gasket seal 150 is disposed within the flow passage 152. The gasket seal 150 can resemble a grommet-like structure that plugs into the flow passage 152. The gasket seal 150 helps to seal the fluid filter 100 when it is connected to remaining equipment of a filtration system and helps separate filtered fluid from fluid to be filtered.

As further shown in FIG. 10, for example, the filter element 111 can include a center tube 160 having a flow passage 162 therethrough in fluid communication with the open flow passage 152 of endplate 122. As shown, the center tube 160 is connected to both endplates 120, 122, where the media 104 is disposed around the center tube 160 in a cylindrical arrangement, and where the center tube 160 includes apertures 164 that allow the working fluid to flow into and out of the flow passage of the center tube 160. Center tubes in such fluid filters are well-known and need not be further described. It also will be appreciated that a center tube may not be employed at all and the center area inside the filter element 111 can be the flow passage in fluid communication with flow passage 152.

As one example of the flow direction within the fluid filter 100 during operation, a working fluid first enters the fluid filter 100 through the generally open side of the cover 102 and around the endplate 122. The working fluid then flows through the filtering media 104, through the apertures 164, and into the flow passage 162 of the center tube 160. The working fluid exits the flow passage 152 of the endplate 122 after flowing through the flow passage 162 of the center tube 160. (See arrows of FIG. 10.) Fluid filter 10 can also have a similar flow direction (see e.g. FIG. 2). It will be appreciated that the flow direction may be reversed for either of the fluid filters 10, 100 where a working fluid to be filtered first enters the open flow passage 52, 152, flows through the flow passage 62, 162 and apertures 64, 164 of the center tube 60, 160, and then exits the cover.

FIGS. 12-23 show another example of a fluid filter 200 with an improved attachment interface, where a filter element is directly connected to a cap that can be opened and closed for filling. As above, an endplate structure is described that also can provide a control feature helpful to insure that the correct filter element is being assembled into the fluid filter and can help make installation easier. The descriptions herein can also provide a filter element that protects aftermarket considerations, as the correct filter element is needed for installation/servicing. Furthermore, FIGS. 12-23 show features that further facilitate servicing of the fluid filter, such as filling the fluid filter when the cap is opened and also venting when filling the fluid filter.

In one embodiment, the fluid filter 200 is employed as a fuel filter. Fuel filters and their uses are well known. For illustration purposes only, the inventive concepts for a filter design are described with respect to a fuel filter. It will be appreciated, however, that the disclosure is not meant to be limiting to fuel filters, and that the inventive concepts described herein can be used in and suitably adapted for other fluid filter assemblies, such as by-pass and lube filtration technologies. It will be further appreciated that various working fluids in need of filtration, including but not limited to fuel, can benefit from the inventive concepts disclosed herein.

Figure 23:
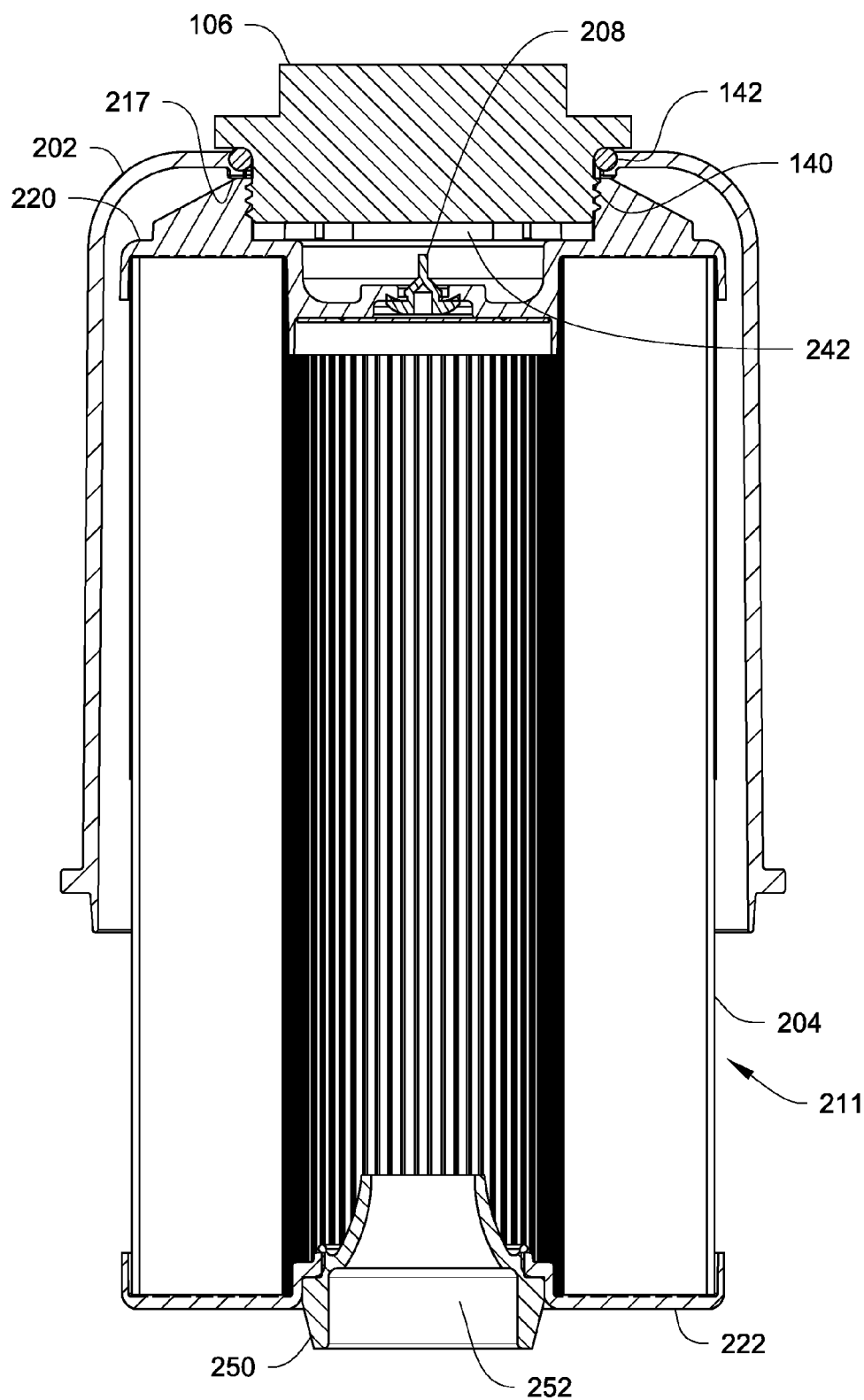
FIG. 23 is side sectional view of a fluid filter showing both the filter element of FIG. 12 and the cover of FIG. 18.

FIGS. 12-17 show another example of a filter element 211, FIGS. 18-22 show another embodiment of a cover 202, and FIG. 23 shows the filter element 211 and cover 102 in assembly. As with the fluid filters 10, 100, the fluid filter 200 is an assembly including a cover 202, a filter element 211, and a cap 106. Fluid filter 200 also does not show outer tabs on an endplate (e.g. tabs 35 in FIGS. 1-8). However, it will be appreciated that the fluid filter 200 may incorporate such tabs as appropriate.

Figure 12:
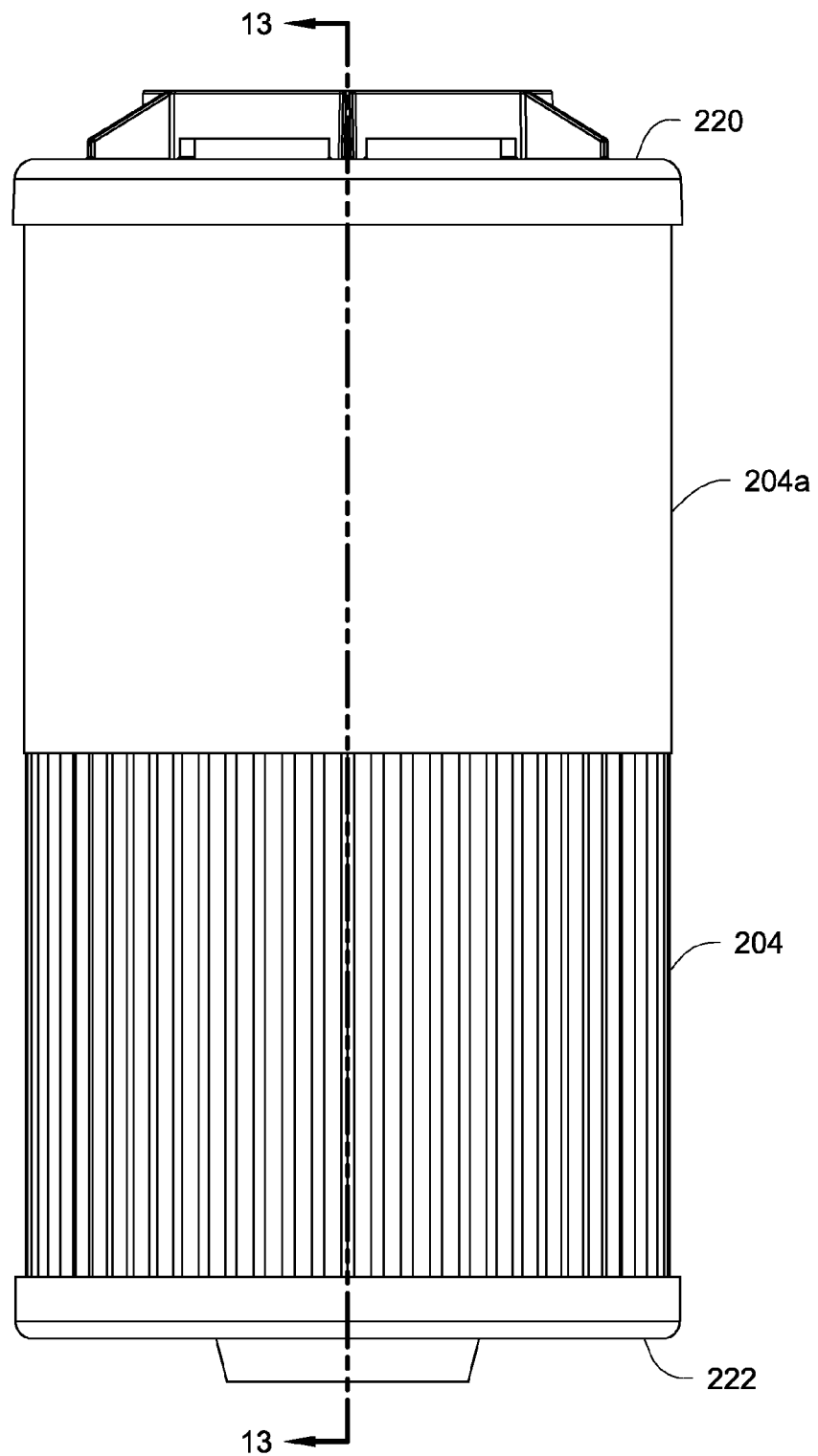
FIG. 12 is a side view of another embodiment of a filter element showing another embodiment of an endplate.
Figure 13:
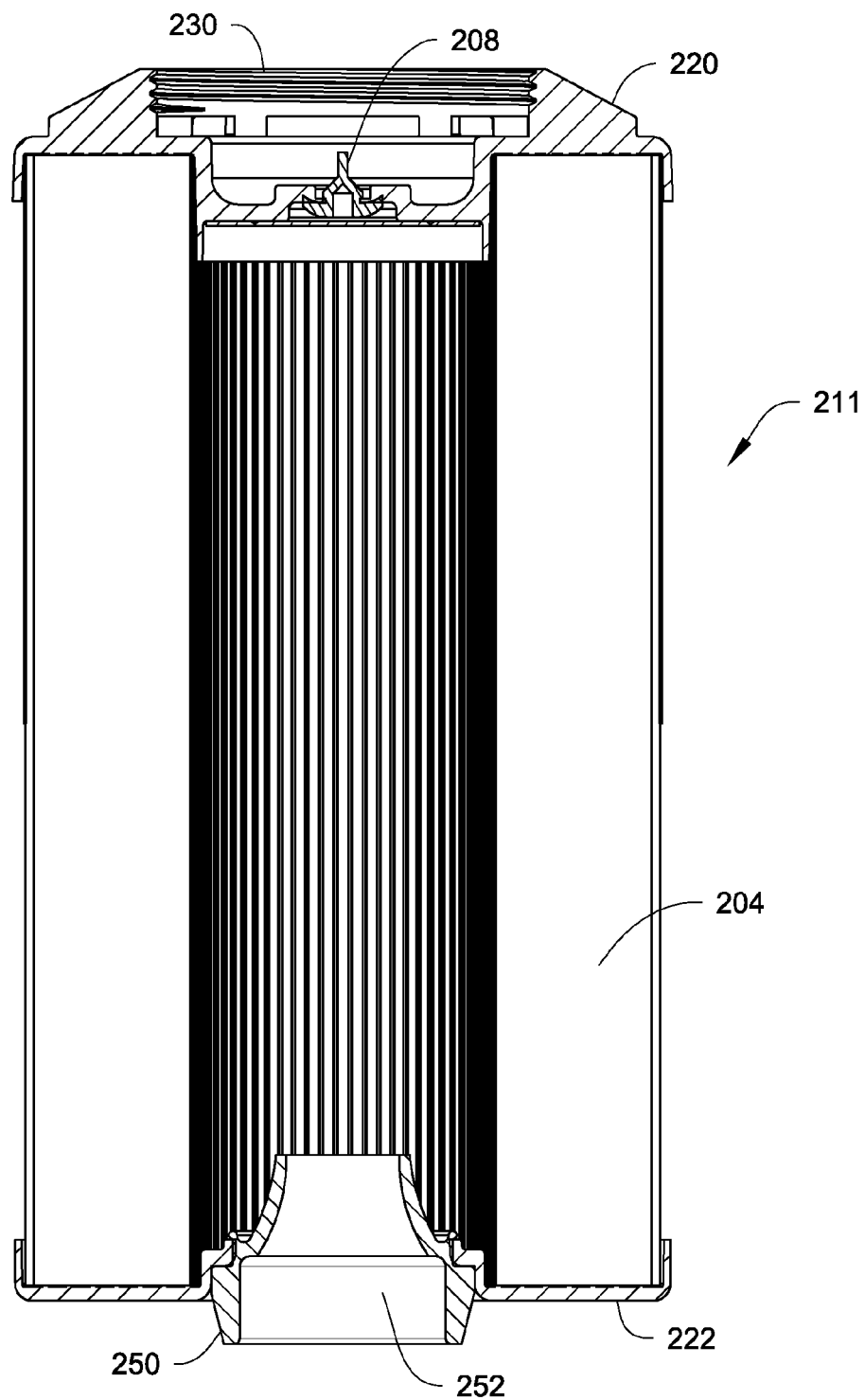
FIG. 13 is a side sectional view of the filter element of FIG. 12.
Figure 14:
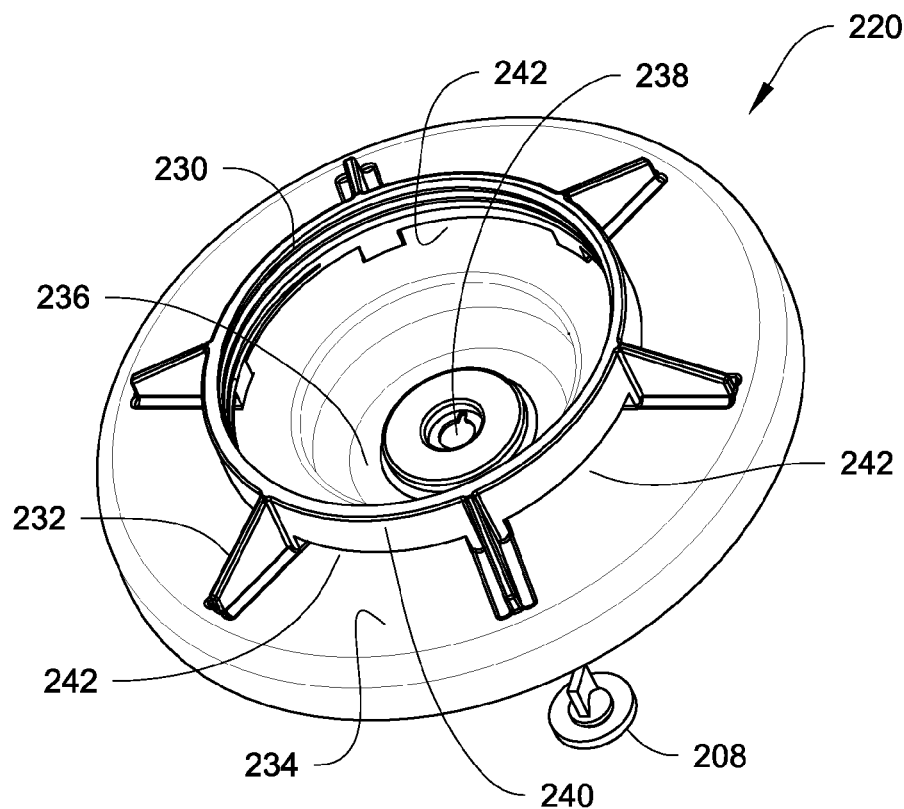
FIG. 14 is a top perspective view of the endplate of FIG. 12.
Figure 15:
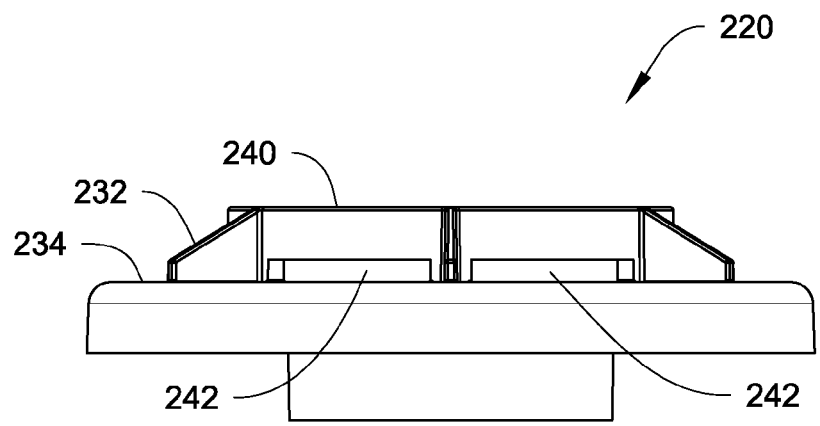
FIG. 15 is a side view of the endplate of FIG. 12.
Figure 16:
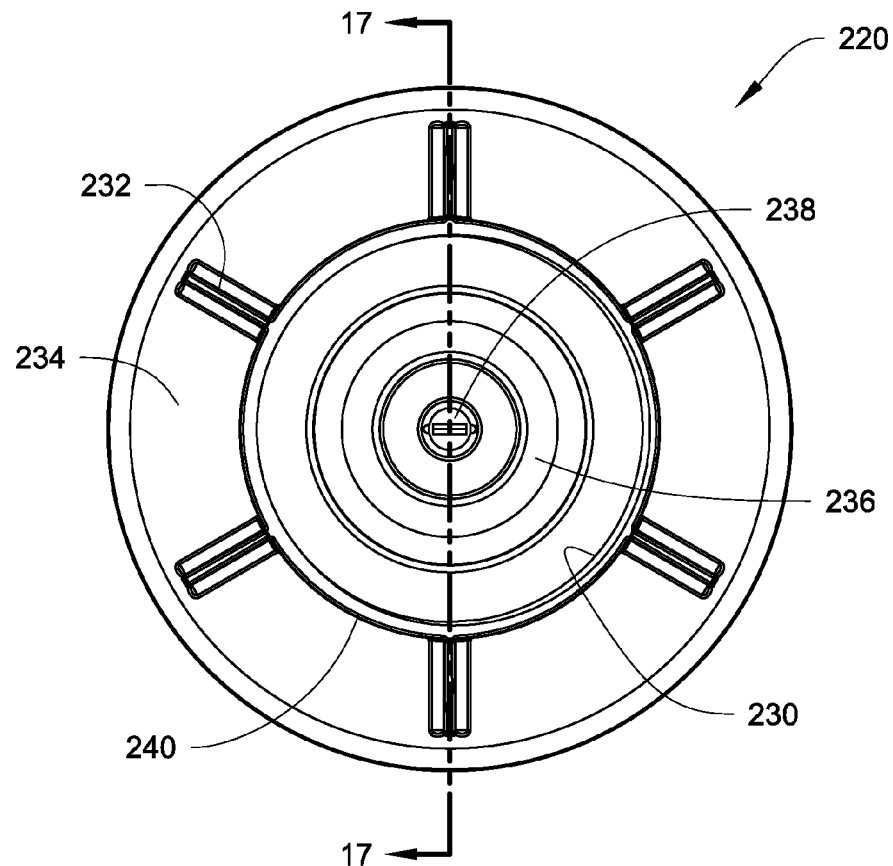
FIG. 16 is a top view of the endplate of FIG. 12.

With reference to FIGS. 12 and 13, the filter element 211 resembles a cartridge-like structure having a filtering media 204 disposed between two endplates 220, 222. Generally, the media 204 allows a working fluid to be filtered therethrough. It will be appreciated that material for filtration media and their construction are well known. It further will be appreciated that the filtering media 204 can have various micron ratings to achieve a desired filtration capability for removing undesired contaminants of various sizes from the working fluid. As some examples only, the filtering media 204 can be constructed of material so as to give the filtering media a micron rating in the range of 3 to 50 microns. Installing the proper micron rated filter element into a fluid filter is important for maintaining efficient filtration in a given filtration system and for protecting operating equipment, such as an engine.

As one example, the media 204 is a pleated material that can have a wrap 204a. It will be appreciated that the pleated construction and the wrap are just one example of a construction for the media 204 and are not meant to be limiting.

In one embodiment, endplate 222 is a bottom endplate and includes an open flow passage 252 that allows a working fluid to flow into or out of the filtering media 204 during operation. The flow passage 252 is for connecting the fluid filter 200 to other equipment of a filtration system, such as a standpipe which is known (not shown). In one embodiment, the endplate 220 is a top endplate. It will be appreciated that either endplate 220, 222 may be configured to have the flow passage 252, and that the reference to top and bottom is for illustration purposes. The orientation of the filter element 211 with respect to its positioning in the cover 202 is dependent upon which of the endplates 220, 222 has the flow passage 252.

With reference to FIGS. 12-17, in some examples, the endplate (e.g. endplate 220) that does not have the flow passage (e.g. 252) is generally a closed structure. That is, the endplate 220 is not a part of the operative fluid flow during filtration, and is opposite of the endplate (e.g. endplate 222) having the fluid flow passage. In some cases, the endplate 220 does not have any openings and closes off one end of the filter media 204. In other examples, the endplate 220 can have a valve 208 disposed at an opening 238 thereof.

Figure 17:
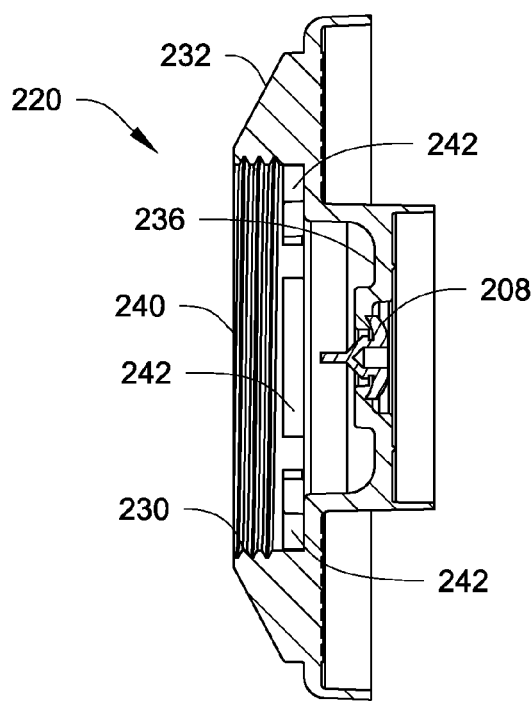
FIG. 17 is a side sectional view of the endplate of FIG. 12 taken from FIG. 16.
Figure 18:
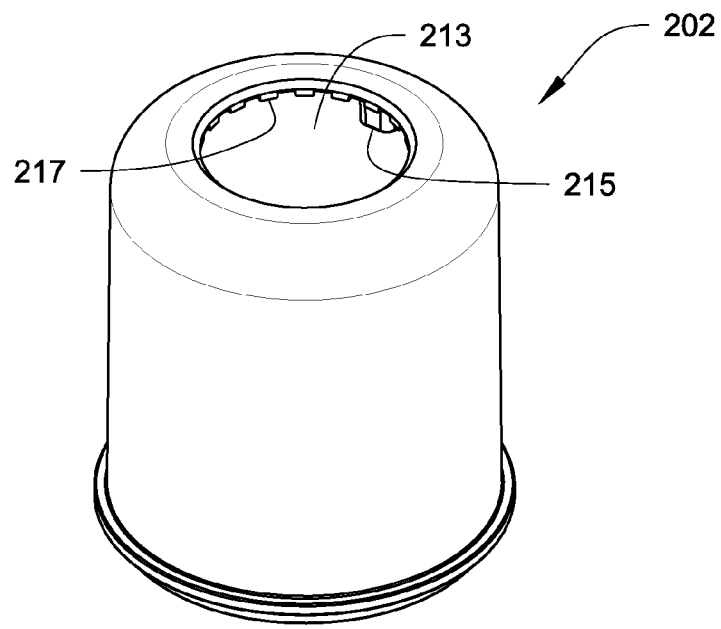
FIG. 18 is a top perspective view of another embodiment of a cover for assembly with the filter element of FIG. 12.
Figure 19:
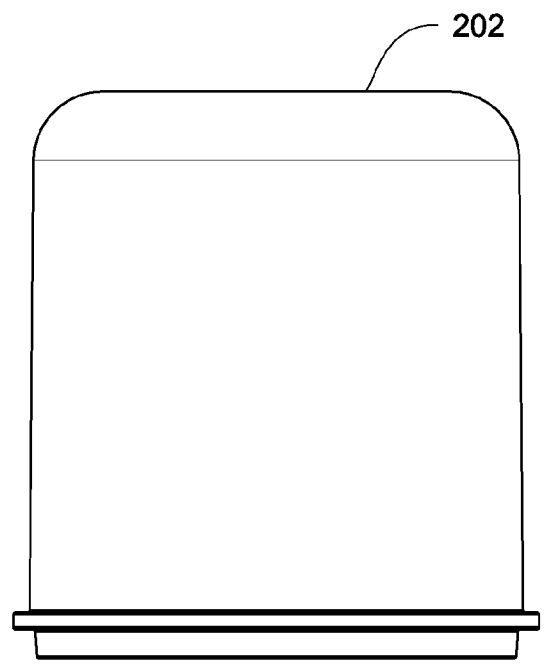
FIG. 19 is a side view of the cover of FIG. 18.
Figure 20:
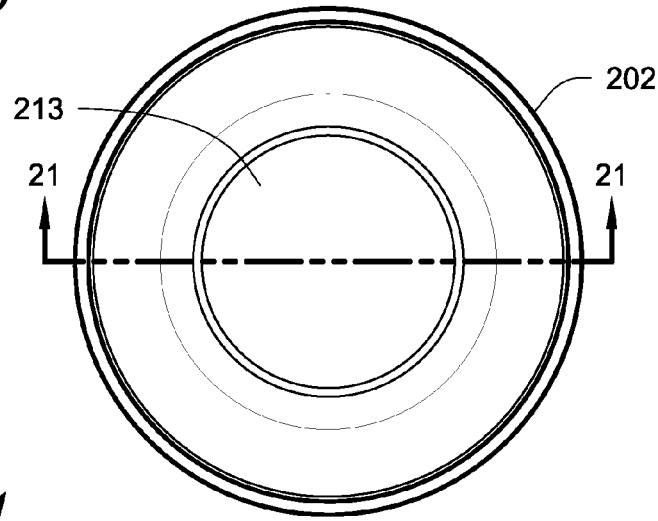
FIG. 20 is a top view of the cover of FIG. 18.
Figure 21:
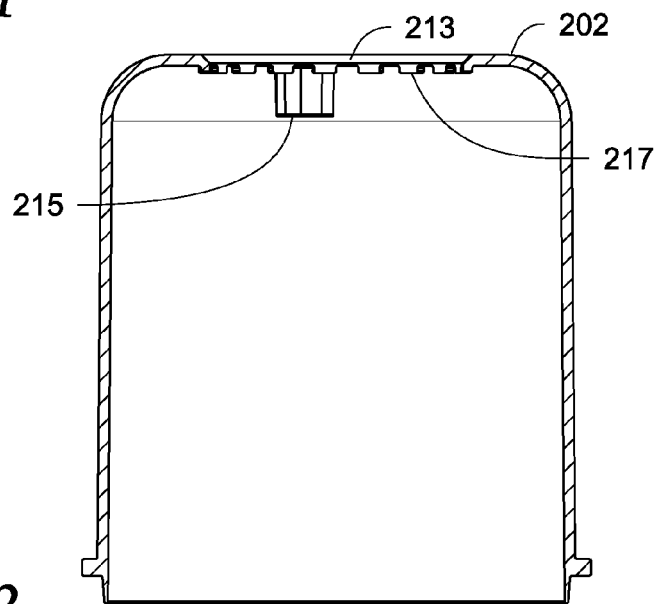
FIG. 21 is a side sectional view of the cover of FIG. 18 taken from FIG. 20.
Figure 22:
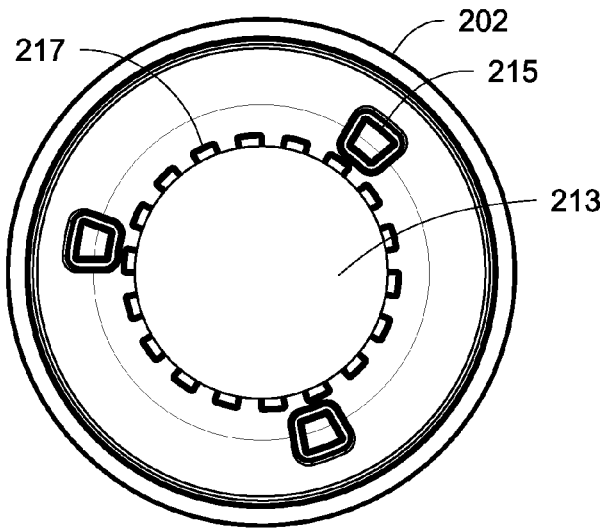
FIG. 22 is a bottom view of the cover of FIG. 18.

When such a valve 208 is employed, it can close over time during operation, for example when the filter element 211 needs to be replaced, such as when the fluid filter 200 is filled with 'dirty' fluid during its particular filtration application (e.g. fuel filtration). As one example, the valve 208 is a pressure relief valve, check valve or cracking pressure valve as generally known by one of skill in the art. As shown in FIG. 17, for example, the valve 208 is a one-way seated member or plunger-like structure that closes the relief opening 238 in the endplate 220.

With reference to FIGS. 18-22, the cover 102 can generally house the filter element 211. The cover 202 has an opening that is in fluid communication with the flow passage 252 of the endplate 222. As with covers 12, 102, the cover 202 may be a clear or generally transparent cover that one can see through. The cover 202 is generally open on a side or end that is in fluid communication with the flow passage 252. The cover 202 also includes an opening 213 this proximate the endplate 220 when assembled to the filter element 211. As with covers 12, 102, cover 202 has top and bottom wall surfaces, and an annular rim that surround the opening 213. These wall surfaces are retained between the direct connection of the cap 106 to the endplate 220 when the fluid filter 200 is assembled (see also FIG. 23).

The cap 106 closes the opening 213 of the cover 102. In the example shown, the cap 106 is similar to the embodiment of FIGS. 9-11, but it will be appreciated that the cap 106 also may be employed or rather any similar cap may be employed as suitable and appropriate. Similar to fluid filters 10, 100, a seal (e.g. seal 142) can be disposed about the opening 213 or on the cap 106. As described above, the seal 142 in one embodiment is an o-ring. In the closed position, the cap 106 is directly connected to the endplate 220.

With further reference to FIGS. 14-17, the endplate 220 includes a connection structure 230. As described above, the cap 106 is connected to the connection structure 230 of the endplate 220, such that the cover 202 is retained between the cap 106 and the endplate 220.

In one embodiment, the connection structure 230 of the endplate includes a threaded arrangement. As shown, the connection structure 230 is a threaded portion that can be threadedly engaged with a threaded portion 140 on the cap 106. As one example, the connection structure 230 is constructed as a raised boss structure extending from a main surface of the endplate 220 and having a female threaded portion, and the cap 106 is constructed as a male threaded portion. The raised boss is further described below.

It will be appreciated that other threaded arrangements may be employed, for example, the endplate 220 may have the male thread and the cap may have the female thread. It further will be appreciated that the connection structure 230 of the endplate 220 is not meant to be limiting to a threaded arrangement. Other examples that can be used include but are not limited to a snap fit, an interference fit, or a quarter turn lock, or other connection structures as known in the art. Generally, a direct connection is desired between the cap 106 and the endplate 220, so that the cover 202 is retained by such connection, but where the specific nature of the connection is not meant to be limiting.

With the direct connection between the cap 106 and the endplate 220, the cover 202 can be easier and more cost effective to produce. In previous fuel filters, the cap was connected directly to the shell or cover (e.g. by threaded engagement) and typically employed a coil spring to help maintain the filter element (e.g. cartridge) in position. The fluid filters described herein, however, eliminate the thread on the cover or housing and can eliminate the need for a spring. Such a spring-less configuration can provide for a more generically produced cover with added freedom as to the materials that may be employed to produce it. As the spring can be eliminated, problems associated with spring failure or spring pressure overcoming the assembly connection can also be avoided. Other benefits can include an overall height reduction of the fluid filter, since a spring is no longer needed which previously increased filter height. Further, as the direct connection of the endplate with the cap retains the cover, easier servicing can be achieved because the cap, filter element, and cover can be removed together without first removing the cover from the filter element.

It will be appreciated, however, that the fluid filter designs described herein can be used in retrofit applications of existing fluid filters. As one example of a retrofit application, the endplate and cap design described herein can be used with other fuel filters such as those produced by DAVCO Technology, LLC. For example, the threaded portion of the endplate 220 can be constructed to mate with threaded configurations of existing caps. Additionally, the endplate 220 can have its connection structure 230 be constructed so that the raised boss structure has a recessed surface 236 that can act as a spring pocket when a spring is used. The raised boss of the connection structure 230 and the recessed surface 236 can still allow for a spring to be disposed between the cap 106 and the endplate 220, while having enough clearance so that the spring does not interfere with the attachment of the cap 106 and the endplate 220. For example, the diameter considerations of the recessed surface 236 and boss structure can be modified accordingly so as to provide retrofit capability.

It also will be appreciated that the recessed surface 236 is not used, for example, when a retrofit application (e.g. for a coil spring) is not needed. In such instances, there is no recessed surface 236, and may be replaced with a surface that is generally level or even with the main surface of the endplate (including e.g. landing areas 234). In other embodiments, the recessed surface may be replaced with a raised, inclined or domed surface, such that a run-off function can be provided from generally the center of the endplate, which can be useful for example, during a filling service of the fluid filter 200. It will be appreciated that the raised, inclined, or domed surface can be sized and configured to be within the connection structure 230 and have a profile so as not to inhibit connection with the cap 106.

With further reference to the connection structure 230 and the raised boss configuration, FIGS. 14-17 show one embodiment where the connection structure 230 is constructed as a raised boss structure extending from a main surface of the endplate 220. Similar to the filter element 111, such as shown in FIG. 9, the connection structure 230 of filter element 211 has a continuous upper rim portion 240, and openings 242 or windows under the upper rim portion 240 which are between the sidewalls 232. See also e.g. space through the connection structure 130 in FIG. 9. The upper rim portion 240 (with the thread connection structure 230) is raised from the main surface of the endplate 220, where the sidewalls 232 provide structural support and connection to the main surface of the endplate 220. The arrangement of the upper rim portion 240 and openings 242 provide raised or clearance areas, where fluid can flow around the outside of the endplate 220, such as during a fill servicing application. That is, the openings 242 allow fluid to be filled into the fluid filter 200 when removing the cap 106. While the upper rim portion 240 is shown as continuous, it will be appreciated that the upper rim portion 240 may not be continuous, and instead may have gaps or spaces along the circumference, which can further provide larger and/or more openings to facilitate filling.

With further reference to filling the fluid filter 200 and servicing, FIGS. 18-22 show another feature of the cover 202 that can help with venting during the fill servicing. As shown, the cover 202 has a number of standoffs 217 disposed on an undersurface of the cover 202. The standoffs 217, which resemble small bump-like structures, provide small spaces or gaps between the cover proximate the opening 213 and the upper rim portion 240 of the endplate 220. These spaces or gaps allow for venting when the fluid filter 200 is being filled. In the embodiment shown, the standoffs 217 are provided on the cover 202, however, it will be appreciated that the standoffs 217 could be disposed on the endplate, for example, on top of the upper rim portion 240 of the endplate 220.

As described above, the endplate 220 in some embodiments is configured and arranged to control which filter element can be used in the fluid filter assembly. In one example, the connection structure 230 is configured to indicate a micron rating of the filter element. When a threaded engagement is employed, for example, the threaded portion on the endplate 220 can have a certain thread configuration that corresponds to a certain micron rating. For instance, more or less threads and the spacing of the threads can be modified to correspond to various micron ratings (e.g. ranging from 3 to 50 microns). That is, the micron rating of the media of the filter element can be dependant upon and correspond to the thread structure used for the endplate. For example, low micron rated filter elements may have less threads and higher micron rated elements can have more threads. In such a configuration, the connection structure 230 (e.g. threaded portion) can help ensure that the filter element 211 with the correct micron rating is installed. That is, if the correct micron rated filter element is not selected, then it will not mate to the cap 106.

The endplate 220 can include other structures, which can help with indicating the micron rating of the filter element 211, and also help with alignment and maintaining the position of the endplate 220 relative to the cover 202. While FIGS. 12-17 show such micron rating, alignment, and position maintenance features together in the filter element 211, they are not necessarily required in combination with the filter element 211, which can include any one of these structures alone or in combination with the threaded engagement feature described above.

With further reference to FIGS. 14-17, the endplate 220 in some embodiments can include at least one landing area 234 (or slot as in FIGS. 9-11) on its outer surface. In one example, an outer side wall of the connection structure 230 (e.g. raised boss), and additional sidewalls 232 can form the space of the landing area 234, where the sidewalls 232 extend outward from the outer surface of the connection structure 230 and along the main surface of the endplate 220. The landing are 234 is receivable of a protrusion 215 that extends from an inner surface of the cover 202 (see protrusions 215 e.g. in FIGS. 18, 21, and 22). Similarly to the fluid filters 10, 100 above, the protrusion 215 can resemble a wedge-like structure that can be disposed within the space created by the landing area 234.

In one embodiment, the landing areas 234 provide a space to receive the protrusion 215 of the cover 202 and allow for some rotation of the cover relative to the filter element 220. The sidewalls 232 provide some limitation to how much the cover 202 can rotate relative to the endplate 220 or vice versa, to provide an anti-rotate feature.

With further reference to the sidewalls 232, the sidewalls also extend generally upward from the main surface of the endplate 220. The sidewalls 232 are generally perpendicular to the main surface of the endplate 220, and taper toward the perimeter of the endplate 220. As with the sidewalls 32 of endplate 20 in the embodiment of FIGS. 1-8, sidewalls 232 if appropriate can extend from the main surface of the endplate at different angles. For example, the sidewalls 232 can be ramped such that they are come closer together or taper toward each other at the main surface of the endplate. Likewise, the protrusions 215 can taper so as to match the same shape taken by the landing areas 234. Such a configuration can allow for easier locating and installment of the cover 202 over the filter element 211.

As with filter element 111, a plurality of landing areas 234 and protrusions 215 may be used. It will be appreciated that the number of landing areas 234 and protrusions 215 is not meant to be limiting.

In some cases as in the embodiment of FIGS. 1-8, when the landing area 234 and protrusion 215 are engaged, their relationship can be configured such that the filter element 211 and the cover 202 are retained to each other. In some cases, the landing area 234 and protrusion 215 can have an interference fit or a snap fit configuration when they are engaged. It will be appreciated that the protrusion 215 can be released from engagement with the landing area 234, such as when a sufficient amount of force is used to remove the cover 202 from the endplate 220 if such disassembly is desired. With such a fitting arrangement, the landing area(s) 234 in some embodiments are configured and arranged to control which filter element can be used in the fluid filter assembly. In one example, the landing areas 234 can correspond to a micron rating of the filter element 211. By way of example, the endplate 220 can have landing areas 234 of a certain size and/or shape, and/or a certain number of landing areas 234, which can be used to show correspondence to a certain micron rating. That is, the micron rating of the media 204 of the filter element 211 is dependant upon and corresponds to the landing area 234 structure (e.g. as in fluid filter 10). In such a configuration, the landing areas 234 can help ensure that the filter element 211 with the correct micron rating is installed. If the correct micron rated filter element is not selected, then it will not engage with the cover 202.

Differently from fluid filter 10, fluid filter 200 does not show tabs (e.g. tabs 35) at the perimeter of the endplate 220. It will be appreciated, however, that a plurality of tabs can be disposed about a perimeter of the endplate 220 as similarly described with respect to the fluid filter 10. Also, such a tab structure if employed can be configured and arranged so as to control which filter element can be used in the fluid filter assembly. That is, tabs can be employed to correspond to a micron rating of the filter element 111.

With further reference to endplate 222, the endplate 222 includes the flow passage 252. The endplate 222 can be connected to a filtration system (e.g. fuel filtration) through various parts, for example a standpipe a filter base which is known. The flow passage 252 allows for exit of 'clean' filtered fluid from the fluid filter 200 or allows for entry of fluid to be filtered depending on the direction of fluid flow. The filter element 211 is disposed within the cover 202, such that that endplate 222 is proximate the generally open side or end of the cover. Such a configuration is sometimes desired since this area of the cover is the inlet/outlet side where filtered fluid and fluid to be filtered respectively exit and enter the fluid filter 200. In some embodiments, a gasket seal 250 is disposed within the flow passage 252. The gasket seal 250 can resemble a grommet-like structure that plugs into the flow passage 252. The gasket seal 250 helps to seal the fluid filter 100 when it is connected to remaining equipment of a filtration system (e.g. to a standpipe of a filter base) and helps separate filtered fluid from fluid to be filtered.

In some embodiments, such as in the embodiment of FIGS. 9-11, the filter element 211 can include a center tube (not shown) having a flow passage therethrough in fluid communication with the open flow passage 252 of endplate 222. It will be appreciated that the center tube may be the same or similar to the center tube 160 of FIG. 11 and used with the filter element 211. As described above, center tubes are well-known and need not be further described. It also will be appreciated that a center tube may not be employed at all and the center area inside the filter element 211 (within the filter media 204) can be the flow passage in fluid communication with flow passage 252.

As one example of the flow direction within the fluid filter 200 during operation, a working fluid first enters the fluid filter 200 through the generally open side of the cover 202 and around the endplate 222. The working fluid then flows through the filtering media 204, and then exits the flow passage 252 of the endplate 222 after flowing through the filter media 204 (and center tube if used). It will be appreciated that the flow direction may be reversed where a working fluid to be filtered first enters the open flow passage 252, flows through the filtering media 204, and then exits the cover 202 outside of the filter element 211.

As described, the improved attachment interface and its various configurations can help provide a keying function for a fluid filter to ensure that the filter element with the correct micron rating is being used. In the example of fuel filtration systems, installation and servicing of a filter element having the correct micron rating is important for maintaining efficient filtration in a given filtration system and for protecting equipment, such as an engine. The attachment interfaces and its features provide inventive concepts that can also help secure aftermarket, where the assembly structure is uniquely configured to prevent others from copying. Retrofitting capability of the endplate and cap structures described herein also is available with existing fluid filters While the above is a complete description of the preferred embodiments of the invention, various alternatives, modifications, and equivalents may be used. These embodiments are described in sufficient detail to enable those skilled in the art to practice the invention, and it is to be understood that the embodiments and their aspects may be combined and interchanged, as appropriate, or that other embodiments may be utilized and that structural and procedure changes may be made without departing from the spirit and scope of the present invention. Therefore, the above description should not be taken as limiting the scope of the invention which is defined by the appended claims.

What is claimed is:

1. A filter element for a fluid filter device comprising:
a top endplate and a bottom endplate;
a media disposed between the top and bottom endplates, the media allows a working fluid to be filtered through the media; and
a flow passage to filter the working fluid, the flow passage being through the media and the bottom endplate,
the top endplate includes a connection structure adapted for direct and removeable connection to a cap that can be opened and closed for filling or servicing the fluid filter device, and adapted to retain wall surfaces of a cover of the fluid filter device between the top endplate and the cap,
the bottom endplate includes an opening that allows the working fluid to flow through the flow passage into or out of the filter media during use of the filter element,
wherein the top endplate is a structure with no flow passage for the working fluid during operation,
wherein the top endplate includes a check valve that closes over time during operation until the media needs to be replaced, and
wherein the working fluid does not flow through the check valve during operation.

2. The filter element of claim 1, wherein the top endplate is a closed structure.

3. The filter element of claim 1, wherein the connection structure is a threaded arrangement.

4. The fluid filter of claim 1, wherein the connection structure further comprises a raised boss structure having an upper rim portion supported by sidewalls, the upper rim portion being raised with respect to a main surface of the top endplate, such that openings are under the upper rim portion between the sidewalls.

5. The filter element of claim 1, further comprising at least one slot on an outer surface of the top endplate.

6. The filter element of claim 5, wherein the at least one slot is configured to correspond to a micron rating of the media.

7. The filter element of claim 1, further comprising a plurality of tabs disposed about a perimeter of the top endplate, the tabs extending outward from the perimeter.

8. The filter element of claim 7, wherein the tabs are configured to correspond to a micron rating of the media.

9. A fluid filter comprising:
a filter element having a media disposed between two endplates, the media allows a working fluid to be filtered through the media, one of the two endplates includes an open flow passage that allows the working fluid to flow therethrough and into or out of the filter media during operation, the other of the two endplates includes a connection structure;
a cover that houses the filter element, the cover having an opening in fluid communication with the open flow passage of the one endplate and having a fill opening proximate the other of the two endplates; and
a cap that closes the cover at the opening proximate the other of the two endplates, the cap has a connection structure to connect to the connection structure of the other of the two endplates,
wherein the cover includes wall surfaces, the wall surfaces being retained between the cap and the other of the two endplates and by connection of the connection structures of the cap and the other of the two endplates, and
wherein the other of the two endplates is a structure with no flow passage out of the filter element for the working fluid during operation,
wherein the other of the two endplates having the connection structure includes a check valve that closes over time during operation until the media needs to be replaced, and
wherein the working fluid does not flow through the check valve during operation.

10. The fluid filter of claim 9, wherein the connection structure is configured to correspond to a micron rating of the filter element.

11. The fluid filter of claim 9, wherein the connection structure of the other of the two endplates is a threaded arrangement, where the cap threadedly engages the other of the two endplates.

12. The fluid filter of claim 9, further comprising at least one slot on an outer surface of the other of the two endplates and further comprising at least one protrusion extending from an inner surface of the cover, the at least one protrusion is insertable into a space defined by the at least one slot.

13. The fluid filter of claim 12, wherein the at least one slot and the at least one protrusion are connected so that the filter element and the cover are retained to each other.

14. The fluid filter of claim 12, wherein the at least one slot and the at least one protrusion are releasably engaged.

15. The fluid filter of claim 12, wherein the at least one slot is configured to correspond to a micron rating of the filter element.

16. The fluid filter of claim 9, further comprising a plurality of tabs disposed about a perimeter of the other of the two endplates, the tabs extending outward from the perimeter.

17. The fluid filter of claim 16, wherein the tabs are configured to correspond to a micron rating of the filter element.

18. The fluid filter of claim 9, wherein the connection structure further comprises a raised boss structure having an upper rim portion supported by sidewalls, the upper rim portion being raised with respect to a main surface of the other of the two endplates, such that openings are under the upper rim portion between the sidewall, the openings providing clearance for when the fluid filter is being filled.

19. The fluid filter of claim 9, wherein the cover further comprises a plurality of standoffs disposed on an undersurface of the cover, the standoffs providing spaces which allow venting when the fluid filter is being filled.

20. A method for assembling a fluid filter assembly comprising:

placing a filter element within a cover that houses the filter element, the filter element having a media disposed between two endplates, the media allows a working fluid to be filtered through the media, one of the two endplates includes an open flow passage that allows the working fluid to flow therethrough and into or out of the filter media during operation, the other of the two endplates includes a connection structure, and the cover to house the filter element, the cover having an opening in fluid communication with the open flow passage of the one endplate and having a fill opening proximate the other of the two endplates, and the cover includes wall surfaces, wherein the other of the two endplates is a structure with no flow passage out of the filter element for the working fluid during operation, wherein the other of the two endplates having the connection structure includes a check valve that closes over time during operation until the media needs to be replaced, and wherein the working fluid does not flow through the check valve during operation;

inserting a cap through the fill opening of the cover the cap to close the cover at the fill opening proximate the other of the two endplates, the cap has a connection structure to connect to the connection structure of the other of the two endplates;

connecting the cap to the other of the two endplates of the filter element; and retaining the wall surfaces of the cover between the cap and filter element and by connection of connection structures of the cap and endplate, the wall surfaces being retained between the cap and the other of the two endplates and by connection of the connection structures of the cap and the other of the two endplates.

* * * * *